(12) United States Patent
Nagaoka et al.

(10) Patent No.: US 7,051,933 B1
(45) Date of Patent: May 30, 2006

(54) NONCONTACT IC MEDIUM AND SYSTEM USING THE SAME

(75) Inventors: Jiro Nagaoka, Tokyo (JP); Satoki Nakajima, Tokyo (JP)

(73) Assignees: C.media Co., Ltd., Tokyo (JP); Itochu Corporation, Tokyo (JP)

( * ) Notice: Subject to any disclaimer, the term of this patent is extended or adjusted under 35 U.S.C. 154(b) by 0 days.

(21) Appl. No.: 09/763,523

(22) PCT Filed: Aug. 30, 1999

(86) PCT No.: PCT/JP99/04671

§ 371 (c)(1),
(2), (4) Date: Feb. 23, 2001

(87) PCT Pub. No.: WO00/13139

PCT Pub. Date: Mar. 9, 2000

(30) Foreign Application Priority Data

Aug. 31, 1998 (JP) ............................. 10-245995

(51) Int. Cl.
G06K 7/08 (2006.01)
G06K 19/06 (2006.01)

(52) U.S. Cl. ...................... 235/451; 235/492
(58) Field of Classification Search ............... 235/375, 235/451, 492
See application file for complete search history.

(56) References Cited

U.S. PATENT DOCUMENTS

| 4,277,837 A | | 7/1981 | Stuckert | |
| 4,900,386 A | | 2/1990 | Richter-Jorgensen | |
| 5,337,063 A | | 8/1994 | Takahira | |
| 5,594,233 A | * | 1/1997 | Kenneth et al. | 235/492 |
| 5,844,244 A | | 12/1998 | Graf et al. | |
| 5,847,662 A | * | 12/1998 | Yokota et al. | 340/10.34 |
| 6,040,786 A | | 3/2000 | Fujioka | 340/928 |
| 6,173,899 B1 | * | 1/2001 | Rozin | 235/492 |
| 6,427,065 B1 | * | 7/2002 | Suga et al. | 455/41.1 |

FOREIGN PATENT DOCUMENTS

| CN | 1160449 | 11/1995 |
| FR | 2 745 103 | 2/1996 |
| JP | 61-180758 | 11/1986 |
| JP | 61-277495 | 12/1986 |
| JP | 63-246292 | 10/1988 |
| JP | 1-59670 | 4/1989 |
| JP | 1-111363 | 7/1989 |
| JP | 01-190496 | 7/1989 |
| JP | 02-062295 | 3/1990 |
| JP | 04-145593 | 5/1992 |
| JP | 04-178689 | 6/1992 |
| JP | 05-030874 | 4/1993 |
| JP | 05-083866 | 11/1993 |
| JP | 06-012571 | 1/1994 |
| JP | 06-119552 | 4/1994 |
| JP | 07-239922 | 9/1995 |
| JP | 07-325895 | 12/1995 |
| JP | 08-129630 | 5/1996 |
| JP | 09-022449 | 1/1997 |
| JP | 09-104189 | 4/1997 |
| JP | 09-244567 | 9/1997 |
| JP | 09-312076 | 12/1997 |
| JP | 10-092673 | 10/1998 |
| WO | WO 97/30414 | 8/1997 |

* cited by examiner

*Primary Examiner*—Thien M. Le
*Assistant Examiner*—April A. Taylor
(74) *Attorney, Agent, or Firm*—Bachman & LaPointe, P. C.

(57) ABSTRACT

There is provided a cellular phone radio that is capable of utilizing a contactless IC media. A contactless IC media 20*b* is molded in the form of a coin and interchangeably born by a cellular phone radio 110. The cellular phone radio 110 includes a media holder 111, a radio transceiver circuit having an antenna 112, and a control circuit that conducts the read control and the write control of digital information with respect to both recording regions of a contactless IC media 20*b* within the media holder 111 and an external contactless IC media 20*a*, ICC, and also includes a processor that conducts information processing on the basis of the read digital information as occasion demands.

19 Claims, 20 Drawing Sheets

NONCONTACT IC MEDIUM AND SYSTEM USING THE SAME

TECHNICAL FIELD

The present invention relates to a contactless IC media and a system to which the contactless IC media is applied. In the present specification, the term "contactless IC media" is directed to general media on which there is mounted a core module based on the specification of a contactless IC card which has been internationally standardized or subjected to international standardization deliberation, for example, in IEC (International Electrotechnical Commission) JTC1 (Joint Technical Committee 1)/SC (Sub-Committee) 17 of ISO (International Organization for Standardization), that is, a contactless IC module.

As specific examples of the system to which the contactless IC media is applied, the contactless IC media is born on a portable communication device, for example, an existing cellular telephone radio, a portable computer device or the like to execute various applications, the portable communication device is spread before an external contactless IC media to read recorded information from the contactless IC media and to execute required processing, information communication is conducted through the contactless IC media or a contactless reader/writer that bears the contactless IC media, and so on.

BACKGROUND ART

As a card type tool that requires security such as an electronic account settlement card or an identification card in an electronic commerce, a contact IC card having an electric contact has come into practical use. Because the contact IC card is so structured as to be electrically connected directly to the reader/writer through the contact, the operation is normally stable. However, because the card is inserted into or drawn off from the reader/writer with a physical contact, there is the possibility that a trouble such as contact failure occurs. Under the circumstances, in recent years, a contactless IC card on which a contactless IC media that enables the transmission of recorded information without any physical contact is mounted has appeared and has been studied for practical use.

The contactless IC card is normally structured by mounting a contactless IC media made up of a radio transceiver circuit having an antenna (coil) and an IC section having a processor and a memory on a card medium. The contactless IC card may be structured by a so-called memory card having no processor in the IC section.

The connection with the reader/writer in the contactless IC card is conducted through the radio transceiver circuit, and a power supply and clocks required for the operation are generally supplied from the reader/writer side. The transmission of information including a power component and so on from the reader/writer is conducted by using a signal resulting from modulating a radio carrier wave of, for example, 13.56 [MHz] in ASK (amplitude shift key). On the other hand, the transmission of information from the card side is conducted by using a signal resulting from load-modulating sub-carrier waves (847.5/423.7 [kHz]) which combine a plurality of signals of, for example, 13.56 [MHz] together. Because it is predicted that a plurality of contactless IC cards are mixed together in the vicinity of the same reader/writer, a technique which is called "anti-collision" for preventing data collision between the respective cards has been established. At present, a modulating system conducted at the time of returning from the card side to the reader/writer is changed, or a return timing is changed, to thereby enable several cards to be identified. The anti-collision technique can be referred to the disclosures of Japanese Patent Unexamined Application Publication No. Hei 5-217032, Japanese Patent Unexamined Application Publication No. Hei 5-266267.

Also, in recent years, cellular phone radios such as PHSs (Personal Handyphone System) or wireless phones, and mobile computer terminals have been rapidly diffused, and many persons have come to carry the cellular phone radios or the mobile computer terminals. Under the circumstances, an attempt is made to variously add value to the cellular phone radio and so on with the use of the IC card. For example, Japanese Patent Unexamined Application Publication No. Hei 8-87655 discloses an information processing system in which when a holder of an IC card (an owner of the cellular phone radio) inserts the IC card on which information on a bank of account has been recorded into the cellular phone radio to purchase goods or offer paid service, a device for offering the goods or the like acquires the recorded information of the IC card through the cellular phone radio, and automatically conducts electronic account by aid of the acquired recorded information. In this example, the IC card is formed of a contact type IC card, and the cellular phone radio side is equipped with a contact type reader/writer having an electric contact.

As described above, because no electric contact is required for the contactless IC card, the IC module can be downsized, thinned and mass-produced as compared with the contact IC card. Also, even if a plurality of contactless IC cards are mixed together in the vicinity of the same reader/writer, since the reader/writer side can discriminate those IC cards, the same application mode as that of the contact type IC card is enabled. In addition, the reader/writer for reading the information recorded on the contactless IC card can be downsized and lighted in weight more than the contact type IC card.

However, most of the conventional contactless IC cards record the information in card unit. That is, the application of the IC card is determined in each of the cards. For that reason, the user is burdened down with holding a plurality of contactless IC cards according to the purposes of applications and finding out an appropriate IC card when using the IC card.

Also, for example, in the above-mentioned information processing system, if the contact type IC card is replaced by the contactless IC card, the reader/writer can be downsized, and the cellular phone radio per se is also expected to be lighted in weight. However, the conventional reader/writer of this application conducts only information interchange with a memory of a built-in contact type IC card (or the built-in contactless IC card) or an external contactless IC card, and it is not supposed that information is interchanged between the built-in contact type IC card (or the built-in contactless IC card) and the external contactless IC card.

As described above, up to now, it is supposed that the contactless IC media is embedded in a card-shaped medium and used in the card unit. However, the contactless IC media is not naturally limited to the conventional application mode. Also, it can be expected that the IC media is put to practical use not only in a specific field but also in various fields where the information communication is intervened for general purposes.

Under the above circumstances, an object of the present invention is to provide a contactless IC media excellent in general purposes.

Another object of the present invention is to provide an applied system which is capable of adding more values with the use of the contactless IC media.

DISCLOSURE OF THE INVENTION

In order to solve the above problem, according to the present invention, there is provided a contactless IC media characterized in that a contactless IC module having a recording area for recording computer readable digital information therein is embedded in a sheet-shaped medium of a given configuration, and an unseparable sticking member or a sticking member which can be again stuck after being separated exists on at least one surface portion of the sheet-shaped medium.

The contactless IC module is usefully portable because of the sheet configuration, and business card information including letter data and image data or encoded letter information can be recorded on the contactless IC module which is stuck on a business card, a postcard or the like.

The present invention is applied to not only the structure in which one contactless IC module is embedded in one sheet-shaped medium, but also a plurality of contactless IC modules are embedded in one sheet-shaped medium, and the respective contactless IC modules and the respective regions including portions at which the sticking members exist can be cut off in specific configurations. The contactless IC media thus structured can be mass-produced and is expected to remarkably reduce the costs. Also, such a contactless IC media can be readily carried by the user and is useful.

From the viewpoint of convenience of carriage, the contactless IC module can be embedded in a stick-shaped medium that can be installed in a stick-shaped housing.

Also, according to the present invention, there is provided a solid-type contactless IC media which is born by a media bearing member. The contactless IC media includes a solid-type module medium of a given configuration in which a contactless IC module having a recording region is embedded. The module medium is integral with an engagement mechanism that allows an engagement and disengagement with respect to the media bearing member by only displacing the position of the module medium so as not to be readily separated from the media bearing member.

When it is necessary to take the convertibility with the existing contact type IC card in use, an electrically conductive member for being rendered conductive to a contact of an external electronic circuit is disposed on a surface portion of the contactless IC module, and the contact type IC card is formed when the IC card is born by a recess of the card medium which is the same configuration as the media bearing member.

In order to solve the above other problem, according to the present invention, there is provided a contactless reader/writer comprising a media bearing member for bearing a contactless IC media having a recording region; a radio transceiver circuit including an antenna; and a control circuit for controlling read and write of digital information with respect to both of the recording regions of the contactless IC media which is born by said media bearing member and an external contactless IC media within a coverage of said antenna through said radio transceiver circuit.

The antenna is embedded in a housing part (for example, a cap that forms a partial structural element of the housing of the contactless reader/writer) positioned between the born contactless IC media and the external contactless IC media. Preferably, the antenna is embedded in the vicinity of the outermost periphery of the housing part so that the coverage of the antenna is not reduced by the housing of the contactless reader/writer.

A plurality of contactless IC media are born by the media bearing member, and the read control and the write control of the digital information with respect to the recording region of any contactless IC media may be selectively conducted through a single or a plurality of radio transceiver circuits. In the case of using a plurality of radio transceiver circuits, it is preferable that, for example, those radio transceiver circuits are operated under the respective different conditions or at the respective different timing, and the read control and the write control of the digital information with respect to the recording region of the contactless IC media suited for the above operating condition among the plurality of contactless IC media is selectively conducted.

According to the present invention, there is provided a contactless reader/writer comprising: a movable media bearing member which is capable of bearing a plurality of contactless IC media each having a digital information recording region on the same plane at the same time; a radio transceiver circuit having an antenna which is disposed at a specific position in parallel with said media bearing member; and a displacement mechanism which displaces said media bearing member on the plane so that said plurality of contactless IC media approach the specific position; wherein the digital information is transmitted/received with respect to a specific contactless IC media through said antenna.

Also, according to the present invention, there Is provided a contactless reader/writer comprising: a media bearing member which is capable of bearing a plurality of contactless IC media each having a digital information recording region at the same time; a read/write mechanism bearing member on which a media read/write mechanism including an antenna and a radio transceiver circuit are mounted; and a displacement mechanism that displaces said read/write mechanism bearing member so that a specific one of said plurality of contactless IC media approach said antenna; wherein digital information is transmitted/received with respect to the specific contactless IC media through said antenna.

In the above contactless reader/writer, the media bearing member specifically includes a plate-shaped holder which is capable of bearing said plurality of contactless IC media at regular intervals at the same time. Said displacement mechanism brings the specific contactless IC media in close contact with said antenna.

The contactless reader/writer according to the present invention not only merely interchanges the digital information with respect to the contactless IC media or the external contactless IC media, but also realizes the same function as a function given to the contactless IC media on the basis of the recording region of the born contactless IC media. With this structure, the contactless IC media or the contactless IC card on which the contactless IC media is mounted can be recognized by an external electronic device or the like.

The contactless reader/writer includes information processing means that executes information processing on the basis of the digital information read through said control circuit, and the information processing result by the information processing means is recorded on the digital information reader, thereby being capable of reducing a range of a design modification of the electronic device side on which the contactless reader/writer should be mounted.

Also, the contactless reader/writer according to the present invention is accommodated in the card medium used in the information processing device on which the card reader/writer is mounted, thereby being capable of realizing a plurality of functions by one card medium.

Further, according to the present invention, there is provided a portable communication device which is capable of enhancing an added value with the use of a contactless IC media.

The portable communication device records, for example, sound source data and image data outputted in association with the sound source data on a single or a plurality of contactless IC media in a portable communication device on which a display is mounted or a portable communication device on which a display and a sound producing mechanism are mounted. Also, the portable communication device includes: a radio transceiver circuit having an antenna which is embedded in a device housing; a control circuit that reads the sound source data and the image data from any one of a contactless IC media born by said media bearing member and an external contactless IC media within a coverage of said antenna; information processing means having a sound source controller that allows the sound producing mechanism to reproduce a sound on the basis of the read information and/or a display controller that allows an image to be displayed on said display; wherein the recorded information of the contactless IC media can be visually or acoustically grasped.

In a portable communication device drivable by a battery, there are provided a coil for receiving an electric power component from the external in a contactless manner; and a charging circuit that converts the electric power component received through the coil into a charge electric power having a given value to charge said battery with the converted charge electric power; wherein the battery is charged with the use of the reader/writer function in the contactless manner.

Further, according to the present invention, there is provided various information transmission systems using a contactless IC media.

A first information transmission system includes: a portable communication device on which a contactless reader/writer according to the present invention is mounted; and a media issuance device that records digital information corresponding to a given value information on the contactless IC media and issues the digital information; wherein a kind of the digital information to be recorded on the contactless IC media can be arbitrarily selected in accordance with the value information. The media issuance device is so designed as to periodically update the digital information corresponding to the same value information, for example, periodical publication article information including letter data. The digital contents including an image, a sound or the like may be recorded on the contactless IC media and then issued.

A second information transmission system includes: a contactless IC media on a surface portion of which guide information which can be visually recognized by a person is described, and in an internal recording region of which mechanically readable digital information representative of the contents corresponding to the guide information is recorded; and a portable communication device according to the present invention which includes means for reproducing the digital information read from the contactless IC media; wherein said contactless IC media are dispersed at a plurality of appropriate positions, respectively. A plurality of contactless IC media may be embedded in the same guide panel on which the guide information is described.

A third information transmission system includes: a plurality of portable communication devices each including a single or a plurality of IC media and a contactless reader/writer according to the present invention wherein each of the portable communication devices can mutually interchange the recorded information of the contactless IC media of the subject communication device.

BEST MODE FOR CARRYING OUT THE INVENTION

Subsequently, embodiments of the present invention will be described in detail with reference to the accompanying drawings.

1. Embodiment of Contactless IC MEDIA

First, a contactless IC media according to an embodiment of the present invention will be described.

(1) Sheet-shaped Contactless IC Media

Figure 1A:
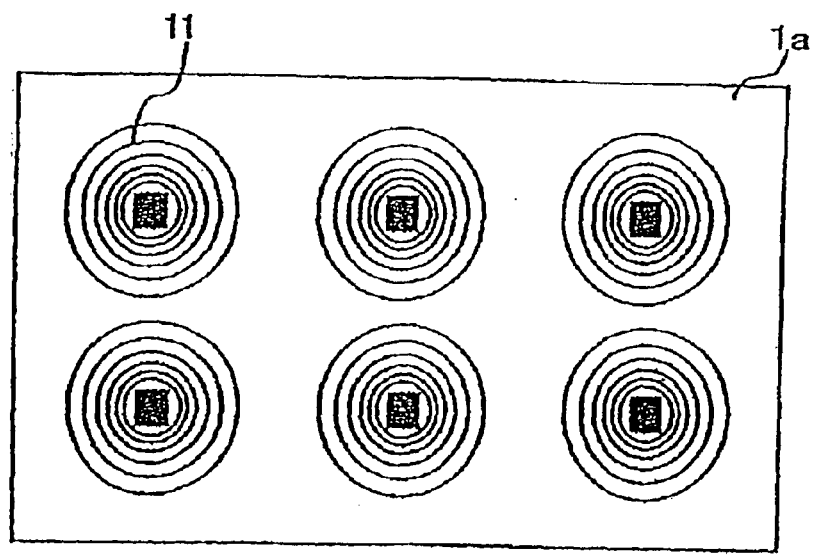
FIG. 1(*a*) is a front view showing a sheet on which a plurality of circular contactless IC media are formed, and Fig. 1(*b*) is a front view showing a sheet on which a plurality of plug-type contactless IC media are formed.
Figure 1B:
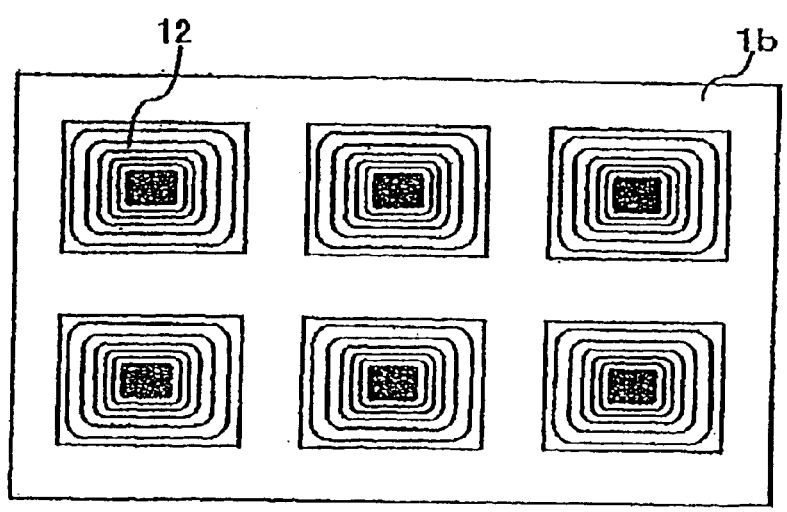

FIG. 1(a) is a front view showing a sheet 1a on which a plurality of circular contactless IC media 11 are formed, and FIG. 1(b) is a front view showing a sheet 1b on which a plurality of plug-type contactless IC media 12 are formed.

Notch portions 11a and 12a are formed along the outer peripheries of the respective contactless IC media 11 and 12 in the respective sheets 1a and 1b so that the contactless IC media 11 and 12 can be cut off from the respective sheets 1a and 1b one by one at the time of using the contactless media 11 and 12. Each of the contactless IC media 11 and 12 is designed in such a manner that a contactless IC module is embedded, for example, in a sheet medium made of thin resin, and a sticking member adheres to an entire or partial back surface of the contactless IC module. The sheet medium is subjected to a surface treatment so that the sheet medium can be printed, and as occasion demands, the sheet medium is subjected to water proofing. In an intended use that needs to maintain security, for example, in the case of adhering the contactless IC media to a finance card or the like in use, the contactless IC media is adhered to a card medium with an unseparable resin adhesive. In an intended use that does not always require the security, the contactless IC media 11 and 12 are made of a raw material which can be again adhered to other portions after the contactless IC media 11 and 12 are separated from portions to which the contactless IC media 11 and 12 are adhered. The latter sticking member can be more simply realized by use of a slow cure adhesive. A magnetic agent may be adhered to the sticking member through a shield member that magnetically shields the contactless IC module from the magnetic agent.

The contactless IC module may be formed of a known IC module including a radio transceiver circuit having an antenna and an IC portion. The IC portion is formed with at least a digital information recording region and a control circuit that controls data write and read between the radio transducer circuit and the recording region.

The recording of the digital information in the recoding region may be conducted ex post facto by a contactless reader/writer which will be described, or may be conducted at the time of producing a module in advance. Also, in the case where the control circuit can be replaced by a reader/writer side control circuit, the control circuit in the IC portion may be omitted.

The contactless IC media 11 and 12 thus structured can be adhered to an arbitrary position where the contactless reader/writer can read the digital information from the recording region. For example, the contactless IC media 11 and 12 can be adhered to a contactless reader/writer main body or an electronic device on which the contactless reader/writer is mounted in use.

Also, the profile, the address, the telephone No. of an individual or a company, etc., are recorded on the contactless IC media 11 and 12 in the form of letter information and image information, and the contactless IC media 11 and 12 are adhered to a mount of a business card or a pamphlet and then distributed to other persons. Information to be printed is recorded on the contactless IC media 11 and 12, and the contactless IC media 11 and 12 are adhered to a printed matter. Information to be mailed is recorded on the contactless IC media 11 and 12, and the contactless IC media 11 and 12 are adhered to the mail, or the contactless IC media 11 and 12 on which propaganda information on a company consisting of multi-media data is recorded are adhered to the leaflet of "company's prospectus" and then distributed. Thus, various use modes can be applied.

In the case where the contactless IC media 11 and 12 are adhered to the mount of the business card, if a logo mark of the company or the like is printed on a front surface of the contactless IC media 11 and 12, and the contactless IC media 11 and 12 are then adhered to a predetermined position of the mount, "electronic business card" which is not strange as compared with the normal business card can be realized.

The advantages obtained by realizing the electronic business card are as follows:

The manual input of data when the business card information is edited and managed by an electronic device becomes unnecessary.

The business card information can be utilized as it is in a device that automatically dials on the basis of phone No. information or a device that sets a destination of navigation or the like on the basis of address information.

Information on company's prospectus, a product catalog, a descriptive pamphlet, information, a written contract and so on can be recorded on the contactless IC media 11 and 12 in addition to the information printed on the surface of the mount.

If voice information is recorded on the contactless IC media 11 and 12 together with the business card information as digital data, the individual information and the company information can be versatilely expressed.

When visiting a customer, the user carries one electronic business card so that the electronic business card can be read by a customer's reader/writer with the results that a binding of a pamphlet and carrying of the binding become unnecessary. The contactless IC media having the recorded information changed according to the intended use can be arbitrarily selected. For example, in case of an intended use that requires only the name, the address, the phone No., and so on, it is sufficient to prepare only an electronic business card having a small capacity, and it is not always necessary to distribute an expensive business card large in memory capacity on which all information is recorded.

Also, digital contents including periodical publication article information such as a newspaper or a magazine, a photographic image or a graphic image, sound data such as a voice, BGM or bird sound, etc., may be recorded on a plurality of contactless IC media 11 and 12 at the same time so that those contactless IC media 11 and 12 can be sold one by one. A person who receives the contactless IC media 11 and 12 reads digital information from the recording region through a contactless reader/writer which will be described later or a normal contactless reader/writer and conducts required information processing, display processing on a display, etc.

The contactless IC media according to the present invention may be embedded in the sheets 1a and 1b, or a single contactless IC module may be embedded in a sheet medium. For example, the contactless IC module can be embedded in a postcard to provide an IC postcard, or the IC module can be embedded in the above-mentioned mount of the business card to provide an IC business card mount.

(2) Stick-shaped Contactless IC Media

Figure 2:
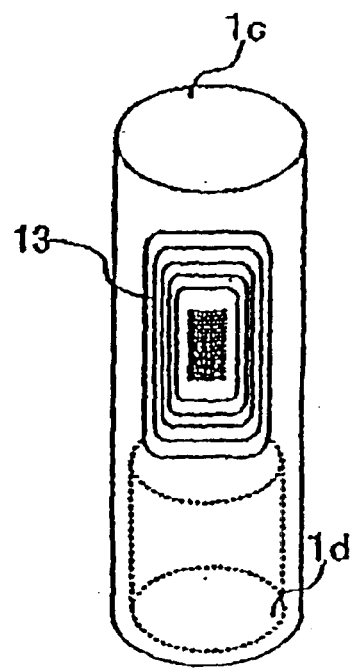
FIG. 2 is a perspective view showing the appearance of a stick-type contactless IC media.

FIG. 2 is a diagram showing the appearance of an example of a stick-type contactless IC media.

A contactless IC media 13 is structured in such a manner that a contactless IC module is embedded in a stick-shaped medium 1c having a recess 1d identical in configuration with an upper end portion of a stick-shaped housing, for example, a pen-shaped housing such as a writing implement.

The contactless IC media 13 thus structured enables the recorded information to be read therefrom or the digital information to be recorded thereon only if the upper end portion of the pen-shaped housing approaches a contactless reader/writer not shown. The contactless IC media 13 where a processor is not mounted on the IC portion but only a data recording region is formed can be used, for example, for an intended use that data is intended to be recorded instantly, or for recording the digital information for only the purpose of reproduction. In the case where a processor and an application program recording region are formed on the IC portion in addition to the data recording region, higher-graded information processing can be conducted, for example, the execution result of application program by the processor can be transmitted to the reader/writer side, or the execution result can be saved in the data recorded region instantly.

(3) Solid-type Contactless IC Media

The contactless IC media according to the present invention is not only sheet-shaped or stick-shaped, but also may be formed of a solid-type media having a certain configuration.

In this example, a coin-type media is exemplified as one example. The coin-type media is born by a media holder (a media bearing member), a portable audio device, a notebook personal computer, a portable game machine, a digital camera, a cellular phone radio, a portable terminal (PDA), a wrist watch, a card medium or the like in an interchangeable state, in use.

The coin-type media is formed in such a manner that a known contactless IC module is embedded in a coin-shaped module medium. The coin-shaped module medium is basically sufficiently of a simple structure that the module medium can be born by the media holder. However, for example, in the case where the module medium is used in a state where the module medium is exposed from the media holder, in order to prevent the module medium from being separated from the media holder in use, the configuration and the structure need to be devised. In this embodiment, an engagement mechanism that allows the engagement and disengagement of the module medium with respect to the media holder by only displacement of the position of the engagement mechanism is integrated with the module medium.

Figure 3A:
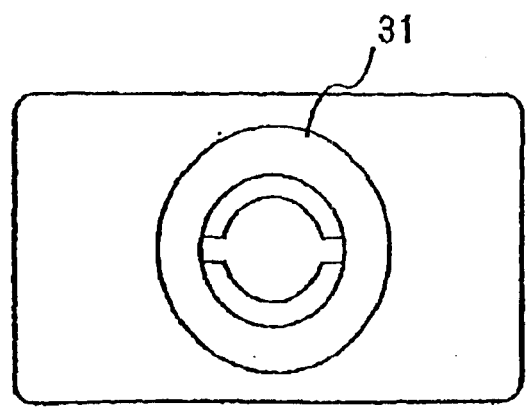
FIGS. 3(*a*) to 3(*c*) are diagrams showing an engagement mechanism that allows the engagement and disengagement of the contactless IC media with respect to a media holder by only displacement of the position of the engagement mechanism, in which FIG. 3(*a*) is a front view showing a media engagement mechanism at a media holder side, FIG. 3(*b*) is an explanatory diagram showing the engagement mechanism at a module medium side, and FIG. 3(*c*) is an explanatory diagram showing the application state.
Figure 3B:
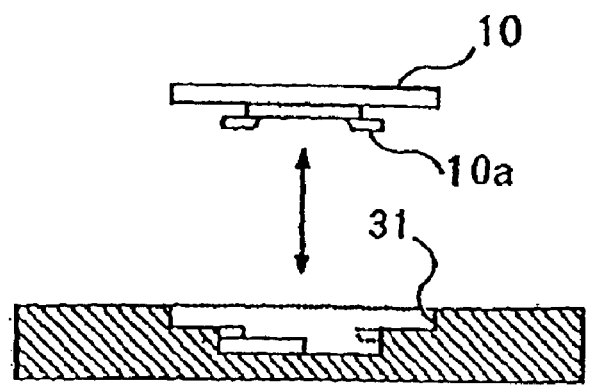
Figure 3C:
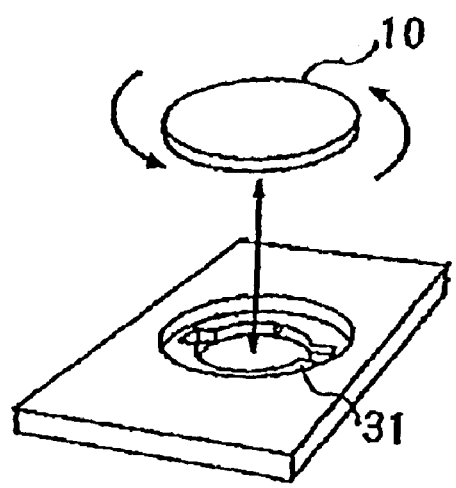

The engagement mechanism corresponds to a media engagement mechanism 31 at the media holder side as exemplified in FIG. 3(a), and its specific structure is shown, for example, in an upper portion of FIG. 3(b). That is, projections 10a that can be engaged with the media engagement mechanism 31 are formed integrally with a rear surface of a coin-shaped module medium 10. When the coin-shaped module medium 10 is used, as shown in FIG. 3(c), the module medium 10 is inserted into the media engagement mechanism 31 and relatively rotated so as to be engaged with the media engagement mechanism 31. When the module medium 10 is disengaged from the media engagement mechanism 31, the module medium 10 is rotated in a counter direction to a rotating direction at the time of engagement.

If the structure shown in the figures is replaced by a structure in which a hinge member a thickness of which changes in a tapered shape in an engaging direction is integrated with a part of the outer peripheral portion of the module medium, and the media engagement mechanism can be engaged with the module medium when the thickness of the hinge member reaches an end of the tapered shape, the configurations and the structures of the module medium and the media holder can be more simplified.

Also, the above description is given of an example of the coin-type media, but if the same engagement mechanism is formed in case of a plug-type media or a solid-type media having another configuration, the module medium can be prevented from being readily disengaged from the media holder. It is needless to say that even if the sheet-shaped contactless IC media 11 shown in FIG. 1(a) is adhered to the coin-shaped module medium, the IC media can be employed as the above-mentioned coin-type media.

In case of a card medium identical in configuration with the general-purpose IC card, when the card medium is intended to be used as the contact type IC card in addition to the contactless IC card in the state where the media holder interchangeably bears the solid-type media, an electrically conductive member is deposited or adhered on a surface portion of the contactless IC media. The electrically conductive member is so designed as to be rendered conductive to a contact of an external electronic circuit, and is normally connected in parallel with a contact portion of the radio transceiver circuit and the IC portion.

The electrically conductive member may be deposited or adhered onto a surface of the sheet-shaped contactless IC media 11 and 12 shown in FIGS. 1(a) and 1(b).

2. Contactless Reader/writer

Subsequently, a description will be given of an embodiment of a contactless reader/writer for using the contactless IC media according to the present invention, or for realizing the same function as that given to the contactless IC media by using the contactless IC media.

This embodiment shows an example of using a simple structure, that is, a coin-type media 20 without the provision of the above-mentioned engagement mechanism 10*a* as the contactless IC media. Similarly, if the above-mentioned sheet-shaped contactless IC media 11 is adhered to the coin-shaped module medium, the IC media can be employed as the coin-type media 20.

(1) First Embodiment

Figure 4:
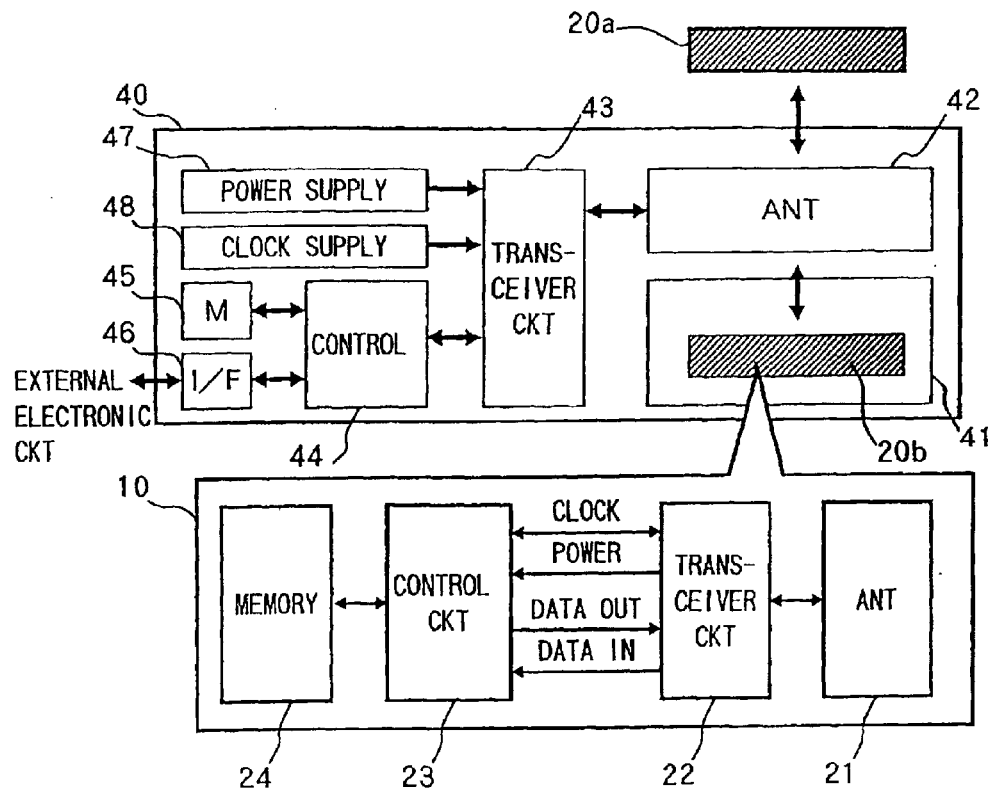
FIG. 4 is a structural diagram showing a contactless reader/writer in accordance with a first embodiment.

FIG. 4 is a structural diagram showing a contactless reader/writer in accordance with a first embodiment and shows a basic structure of other contactless reader/writers which will be described below.

A contactless reader/writer 40 intervenes an antenna 42 between a media holder 41 for bearing an internal coin type media 20*b* and another external coin type media 20*a*. The antenna 42 is normally embedded in a housing cap of the contactless reader/writer. The antenna 42 is connected with a transceiver circuit 43, and the transceiver circuit 43 is connected with a control section 44, a power supply section 47 and a clock supply section 48. The power supply section 47 is so designed as to output a power component which is superimposed on a carrier wave in the transceiver circuit 43, and the clock supply section 48 is so designed as to output a clock component having a predetermined period which is superimposed on the carrier wave. The control section 44 controls the operation of reading recorded information from a memory (M) 45, the operation of writing the information in the memory 45, a timing of transmit/receive waves in the transceiver circuit 43 and communication of information with respect to the external electronic circuit through an external interface (I/F) 46. The control section 44 also has a function of preventing congestion between a plurality of coin type media due to a known anti-collision system.

Each of the coin type media 20*a* and 20*b* includes at least an antenna 21, a transceiver circuit 22, a control circuit 23 and a memory 24.

The control circuit 23 produces an electric power and clocks on the basis of a power component and a clock component which are received from the contactless reader/writer 50 through the antenna 21 and the transceiver circuit 22 and adjusts the operating environments of the contactless module. Also, the control circuit 23 also controls the operation of writing data into the memory 24 (data IN) and the operation of reading data from the memory 24 (data OUT), and transmits the read data, commands and so on to the contactless reader/writer 40 side through the transceiver circuit 22 and the antenna 21. In the memory 24 are recorded identification data for identifying the coil type media, data inherent to the user, simple application program, data, digital contents and so on, as occasion demands.

In case of an intended use that requires the security, a processor that serves as one information processing means is disposed in the coin type media 20*b*, and a code key, a decode key and a code algorism which are readable by the processor are recorded on the memory 24. With this structure, the same function as that given to the coin type media 20*b*, that is, the encoding function and the decoding function can be realized by the contactless reader/writer 40. Likewise, in the case where application program of an execute form is recorded in the memory 24 of the coin type media 20*b*, the application program can be executed by the contactless reader/writer 40. Also, the executed result of the application program can be recorded in the memory 24 of the coin type media 20*b*.

The transmit/receive of information between the contactless reader/writer 40 and the coin type media 20*a*, 20*b* can be realized by the same operating environment as that of the normal contactless reader/writer and the contactless IC card.

For example, the transmission of information from the contactless reader/writer 40 to the coin type media 20*a* and 20*b* can be conducted by using a signal resulting from ASK-modulating a radio carrier wave of 13.56 [MHz], and the transmission of information from the coin type media 20*a* and 20*b* to the contactless reader/writer 40 can be conducted by using a signal resulting from load-modulating sub-carrier waves (847.5/423.7 [kHz]) combining a plurality of signals of 13.56 [MHz] together. As with the conventional contactless IC card, a clock component and a power component in addition to a data component are transmitted to the coin type media 20*a* and 20*b* from the contactless reader/writer 40.

The contactless IC card thus structured can conduct information read control and information write control with respect to the recording regions of both of the internal coin type media 20*a* and the external coin type media 20*a* within the coverage of the antenna 42 by means of the control section 44. This function does not exist in the conventional contactless reader/writer.

Even if those two coin type media 20*a* and 20*b* exist at the same time, since the above-mentioned anti-collision function is effected and those coin type media 20*a* and 20*b* can be readily identified by decoding the identification data, data inherent to the user and so on which are recorded in the memories 24 of the respective coin type media 20*a* and 20*b*, there arises no problem.

(2) Second Embodiment

Figure 5:
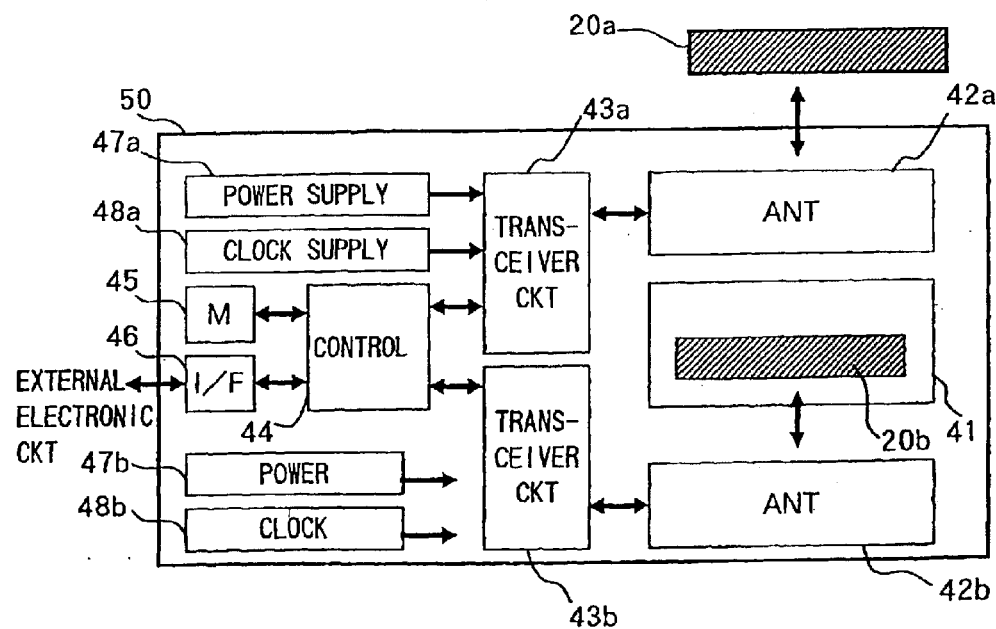
FIG. 5 is a structural diagram showing a contactless reader/writer in accordance with a second embodiment.

FIG. 5 is a structural diagram showing a contactless reader/writer in accordance with a modified example of the above first embodiment, in which the elements identical in function are designated by like symbols for convenience. The contactless reader/writer 50 has two radio transceiver systems having the antennas which operate independently.

In other words, the antenna 42*a*, the transceiver circuit 43*a*, the power supply section 47*a* and the clock supply section 48*a* operate with respect to the external coin-type media 20*a* whereas the antenna 42*b*, the transceiver circuit 43*b*, the power supply section 47*b* and the clock supply section 48*b* operate with the coin type media born by the media holder 41. The control section 44 grasps the operating conditions of those coin type media and selectively conducts the read control and the write control of the digital information with respect to the recording regions of the external coin type media 20*a* and/or the born coin type media 20*b*.

In the contactless reader/writer 50 thus structured, since the data is transmitted and received between the external coin type media 20*a* and the internal coin type media 20*b* through the radio transceiver systems independent from each other, there hardly occurs a problem of congestion.

(3) Third Embodiment

Figure 6:
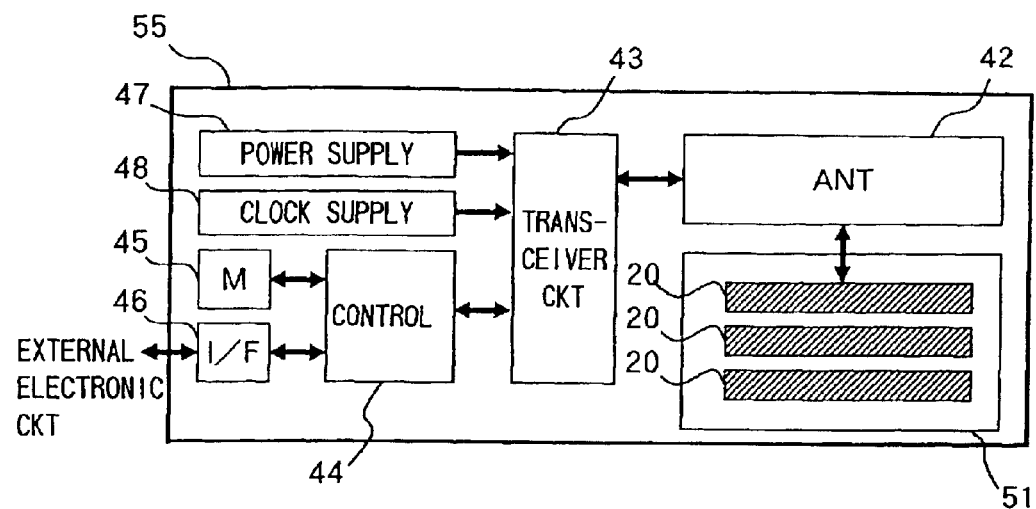
FIG. 6 is a structural diagram showing a contactless reader/writer in accordance with a third embodiment in which one antenna is provided.
Figure 7:
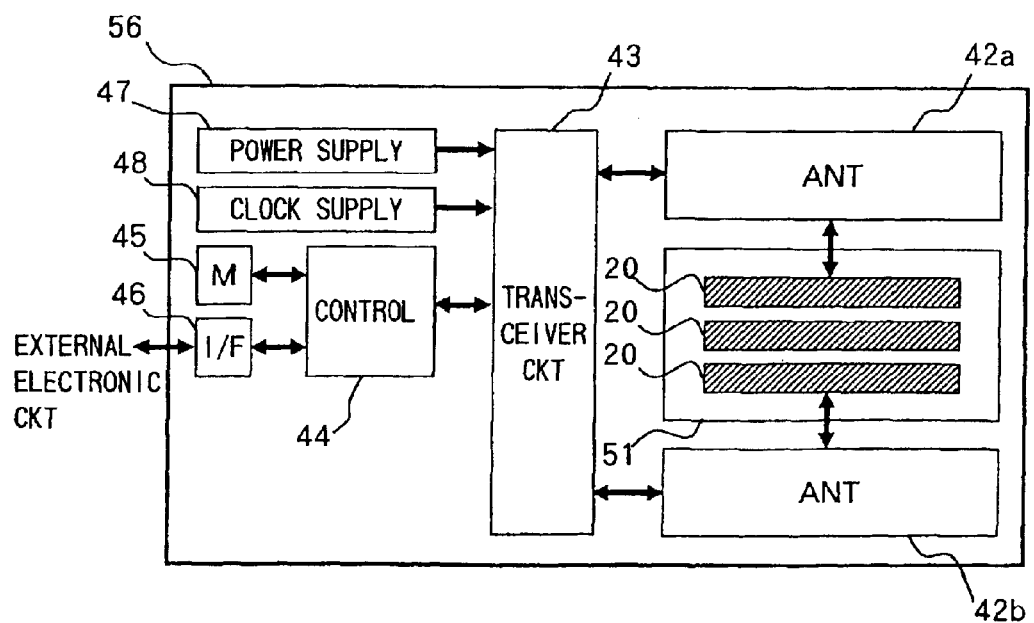
FIG. 7 is a structural diagram showing a contactless reader/writer in accordance with the third embodiment in which two antennas are provided.

FIGS. 6 and 7 are structural diagrams showing the contactless readers/writers 55 and 56 in which a plurality of coin type media 20 can be born by the media holder 51 at the same time, and the elements having the same functions as those in FIG. 4 are designated by like symbols.

FIG. 6 is an example in which one antenna 42 is used, and FIG. 7 is an example in which two antennas 42*a* and 42*b* are used.

In case of the contactless reader/writer 55 shown in FIG. 6, the control section 44 conducts the data read control or the data write control while shifting a timing between the plurality of coin type media 20, or conducts the data read control or the data write control with respect to only a returned response to a sent different command. With this operation, the control section 44 can selectively execute a plurality of application programs in a state where the plurality of coin type media 20 are born at the same time.

In case of the contactless reader/writer 56 shown in FIG. 7, the control section 44 conducts the data read control or the data write control under conditions different from each other according to the use. For example, in an intended use that requires real-time property, high-speed data read is conducted by using the antenna 42a, and in an intended use that requires a high quality property rather than the real-time property, the data read is conducted at a low speed and with a high quality. With this operation, the contactless reader/writer 56 enables multi-purpose data processing according to the use.

Although a description is omitted, the data read control or the data write control can be conducted with respect to the external coin type media through the antennas 42 and 42a, respectively.

(4) Fourth Embodiment

Figure 8:
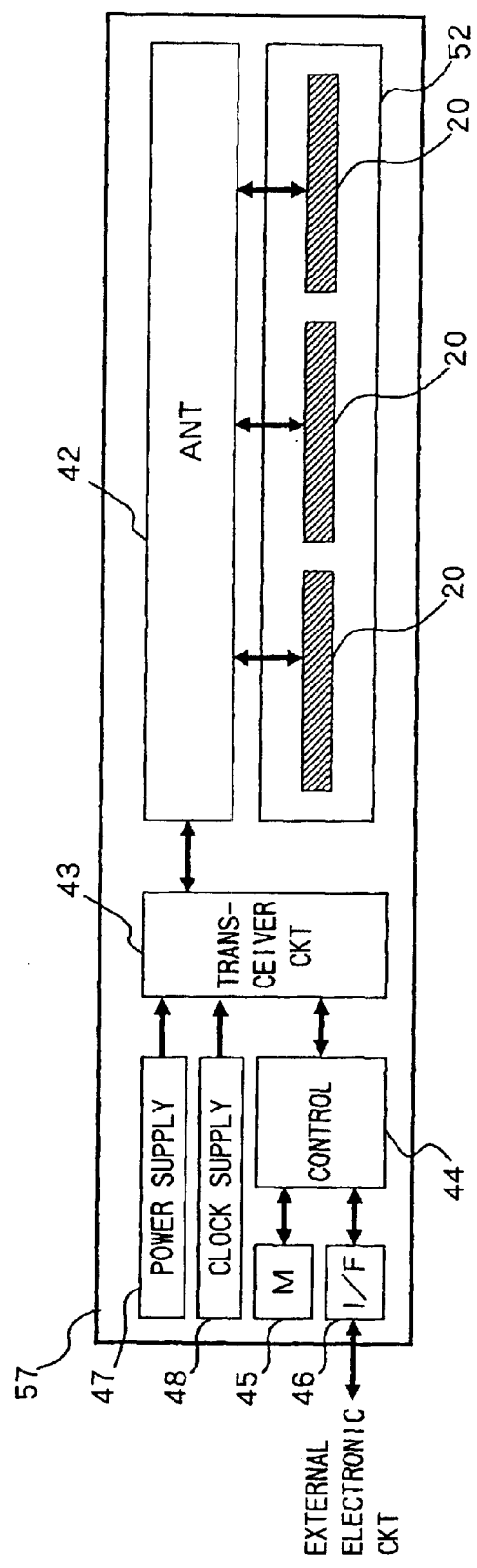
FIG. 8 is a structural diagram showing a contactless reader/writer in accordance with a fourth embodiment in which one antenna is provided.

FIG. 8 is a structural diagram showing a contactless reader/writer 57 that conducts the data read control or the data write control through one antenna 42 between a media holder 52 which can bear a plurality of coin type media 20 in a state where those coin type media 20 are arranged on the same plane and those coin type media 20. The elements having the same functions as those in FIG. 4 are designated by like symbols for convenience.

The antenna 42 is embedded, for example, in a housing cap in parallel with the respective coin type media 20. The basic operation is identical with that in the contactless reader/write 55 shown in FIG. 6.

Figure 9:
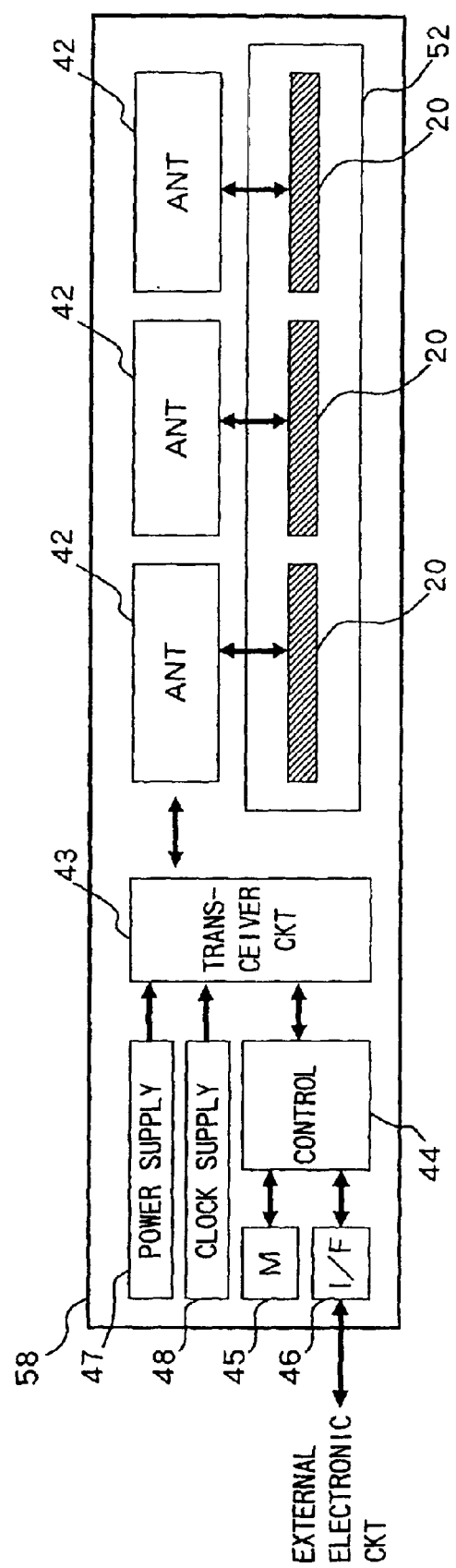
FIG. 9 is a structural diagram showing a contactless reader/writer in accordance with the fourth embodiment in which 5 the number of antennas is identical with that of coin-type media.

FIG. 9 is a structural diagram showing a contactless reader/writer 58 in which antennas 42 having the same number as that of the coin type media 20 arranged within the media holder 52 shown in FIG. B is disposed. Each of the antennas 42 is embedded in the housing cap in parallel with the coin type media 20. Although the basic operation is identical with the contactless reader/writer 56 shown in FIG. 7, since the individual antennas 42 can be brought in close contact with the coin type media 0, there is advantageous in that the occurrence of cross-talk can be reduced as compared with the cases shown in FIGS. 7 and 8.

(5) Fifth Embodiment

FIGS. 10(a) to 10(d) are diagrams showing the structure of a contactless reader/writer which selects a specific one to be subjected to data read/write from a plurality of coin type media.

The contactless reader/writer accommodates a movable media holder having a displacement mechanism within a housing and a radio transceiver system including a close-contact type antenna.

Figure 10A:
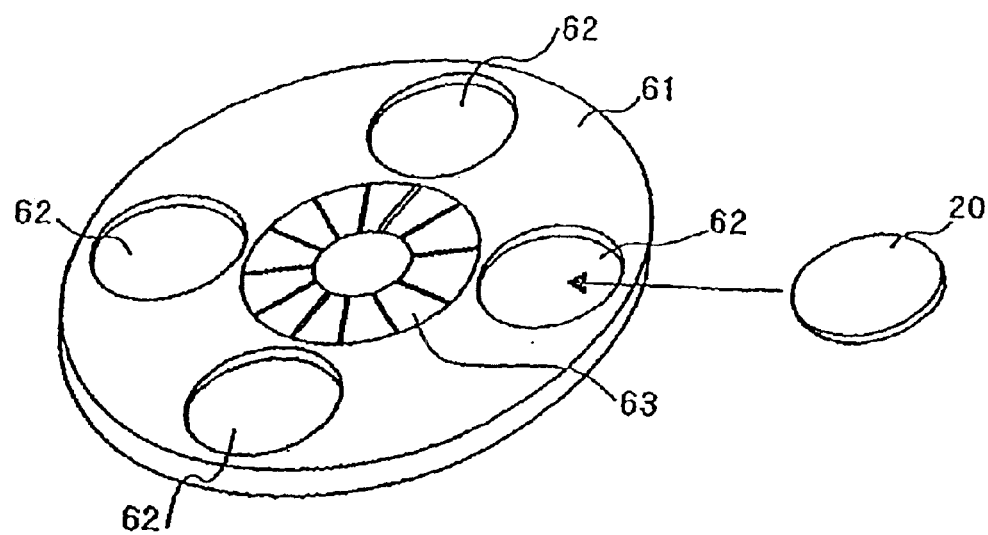
FIGS. 10(*a*) to 10(*d*) are structural diagrams showing a contactless reader/writer in accordance with a fifth embodiment and showing the structure of the contactless reader/writer in which a specific media is selected from a plurality of coin-type media, and data is read/written with respect to the selected media.

As shown in FIG. 10(a), the movable media holder is structured in such a manner that a plurality of hollow portions 62 having the same configuration as that of the coin type media 20 are formed in an annular plate 61 having substantially the same thickness as that of the coin type media 20, and a displacement mechanism 63 for rotating itself on the same plane is fixed onto a center portion of the annular plate 61.

Figure 10B:
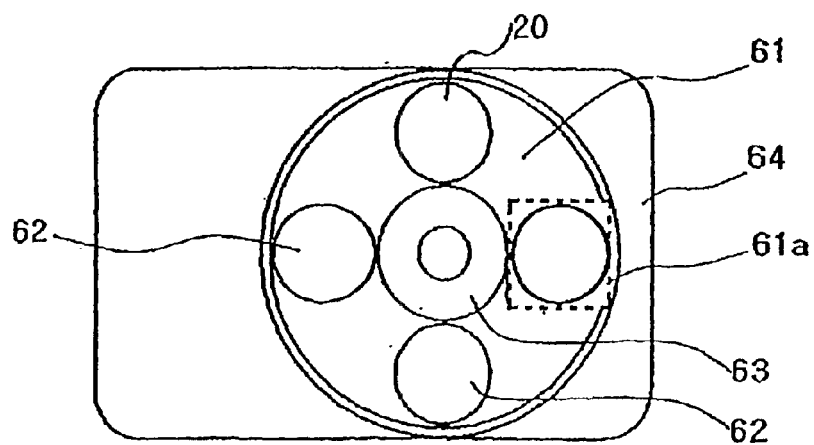
Figure 10C:
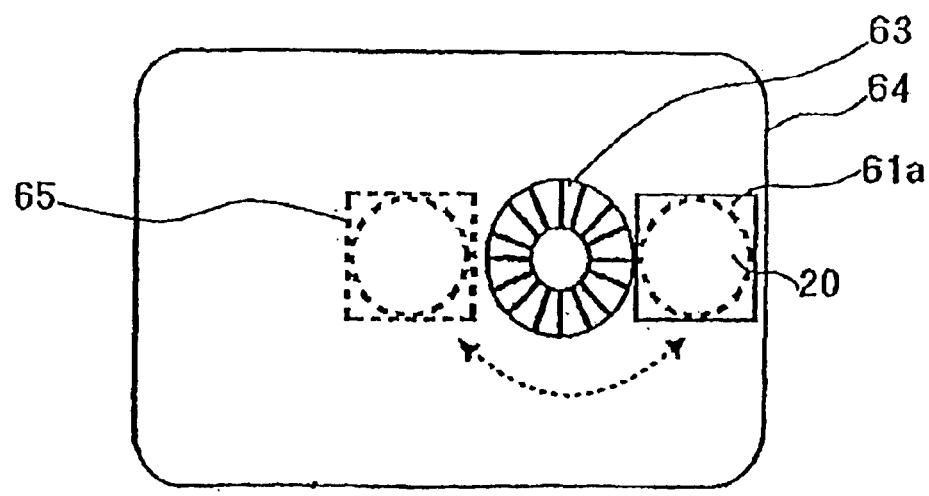
Figure 10D:
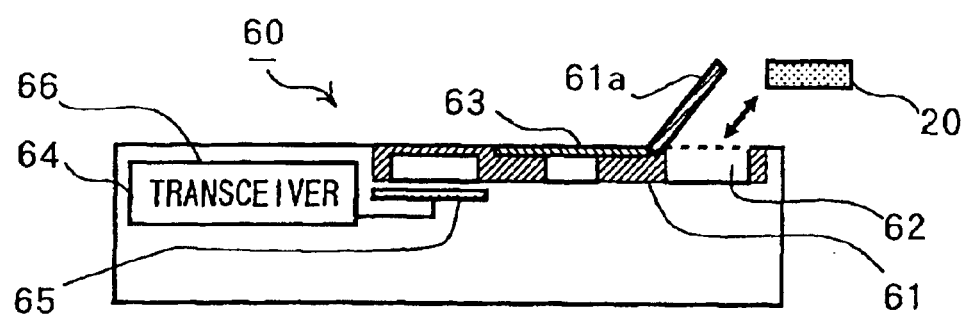

FIG. 10(b) is an internal structural diagram showing a positional relationship of the movable media holder within a housing 64, FIG. 10(c) is a top view showing the housing 64, and FIG. 10(d) is a side cross-sectional view showing a contactless reader/writer 60. Reference numeral 61a denotes a housing window for accommodating the coin type media 20 in the hollow portions 62 or for disengaging the coin type media 20 from the hollowing portions 62, and reference numeral 65 is a close-contact type antenna.

In the contactless reader/writer 60 thus structured, a plurality of coin type media 20 on which different digital information, for example, application program and security data are recorded are accommodated in the hollow portions 62, and the user displaces the displacement mechanism 63 so that a desired coin type media 20 approaches the close-contact antenna 65. The digital information read through the close-contact antenna 65 is sent out to an external electronic device through an external interface circuit not shown. In this manner, an appropriate coin type media 20 can be selectively employed in accordance with the use.

The annular plate 61 is exemplified and it is needless to say that the annular plate 61 may be replaced by another plate differently configured. For example, the present invention encompasses a structure in which a plurality of hollow portions are arranged in a rectangular plate, a fan-shaped plate or the like, and the plate is reversibly slid on the same plane with the use of the displacement mechanism such as a gear so that a desired coin type media 20 approaches the close-contact type antenna. Also, the close-contact type antenna may be replaced by an antenna having a directivity.

(6) Sixth Embodiment

Figure 11A:
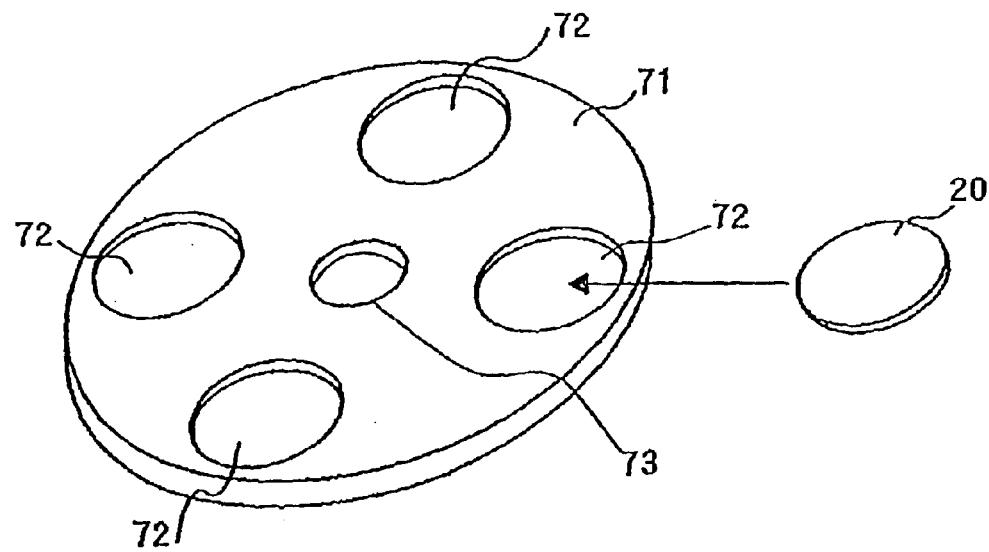
FIGS. 11(*a*) to 11(*c*) are structural diagrams showing a contactless reader/writer in accordance with a sixth embodiment an showing the structure of the contactless reader/writer in which a specific media is selected from a plurality of coin-type media, and data is read/written with respect to the selected media.
Figure 11B:
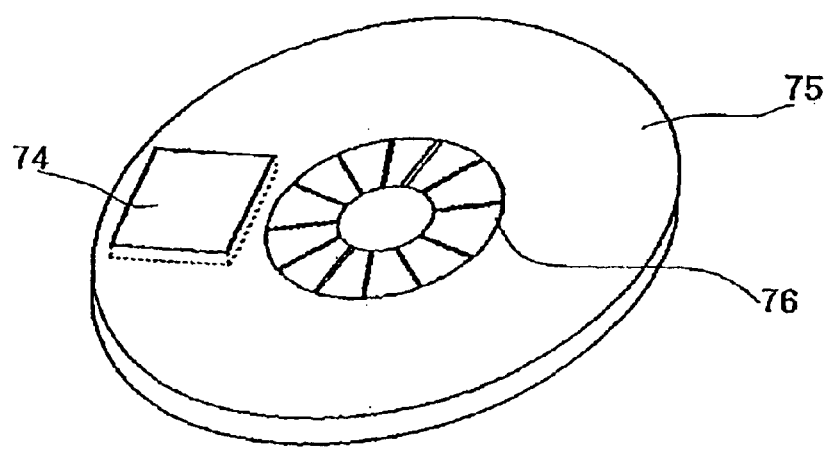
Figure 11C:
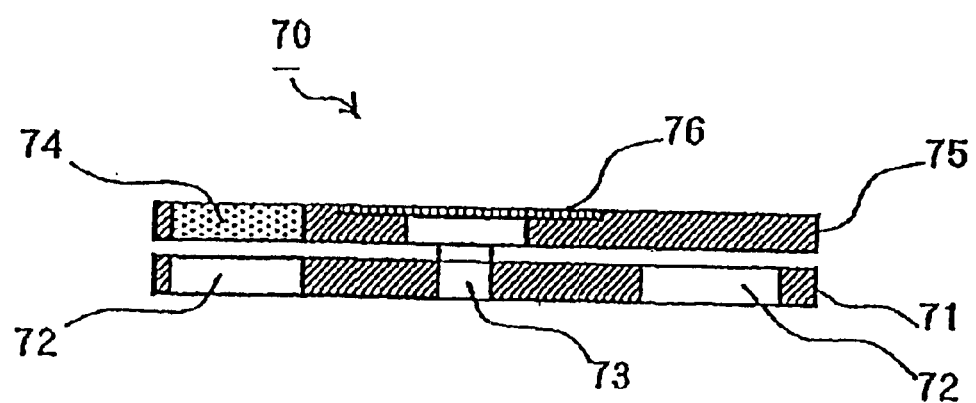

FIGS. 11(a) to 11(c) are diagrams showing the structure of another contactless reader/writer that selects a specific one to be subjected to data read/write from a plurality of coin type media.

The contactless reader/writer accommodates a fixed media holder and a movable read/write mechanism bearing member on which a media read/write mechanism including an antenna and a radio transceiver system is mounted within a housing.

As shown in FIG. 11(a), the media holder is designed in such a manner that a plurality of hollow portions 72 for accommodating a plurality of coin type media 20 therein are formed in an annular plate having substantially the same thickness as that of the coin type media 20. The media holder is loaded at a predetermined position within a housing of the contactless reader/writer after it has born the coin type media 20. Reference numeral 73 denotes a hole defined in the center of the annular plate 71.

FIG. 11(b) is a structural diagram showing a read/write mechanism bearing member. This embodiment shows an example in which a mechanism that reads and writes digital information with respect to the coin type media 20 is structured by making an antenna, a radio transceiver circuit and its downstream circuits into a module. The read/write mechanism bearing member is structured in such a manner that a support member where a displacement mechanism 76 is formed in the center of an annular plate 75 having substantially the same diameter as that of, for example, the annular plate 71, the support member is slidably inserted into a hole 73 of the annular plate 71, and a module 74 having an antenna is embedded in a middle portion of the annular plate 75. The module 74 is embedded at a position where the antenna is brought in close contact with each of the plural coin type media 20 by rotation of the annular plate 75.

The contactless reader/writer 70 thus structured enables the same use mode as that in the fifth embodiment except that a member to be displaced is the module 74 including the antenna. That is, the annular plate 75 is allowed to rotate with the hole 73 as a fulcrum by manipulation of a displacement mechanism ring 76 by the user so that the antenna of the module 74 can approach a desired coin type media 20 as shown in FIG. 11(c).

It is needless to say that the annular plate 75 may be replaced by a plate having another configuration as in the media holder. Also, the module 74 may be replaced by a structure in which only the antenna and the radio transceiver circuit are embedded in the annular plate 75, and the downstream circuits are connected to an internal circuit of an electronic device on which the contactless reader/writer 70 is mounted through an electric contact disposed along a rotating path of the annular plate 75, and so on.

(7) Seventh Embodiment

Figure 12A:
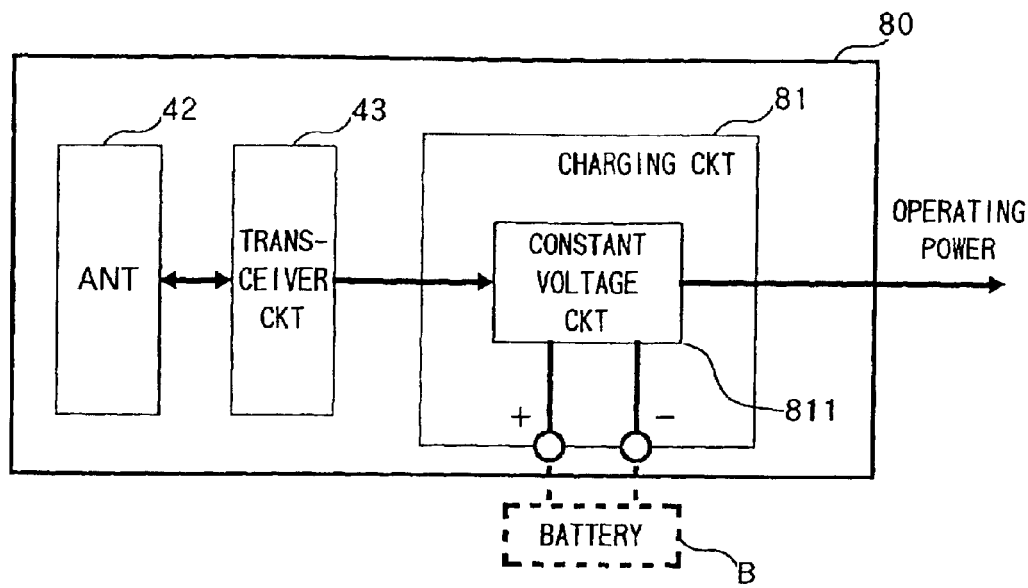
FIGS. 12(*a*) to 12(*c*) are structural diagrams showing a contactless reader/writer in accordance with a seventh embodiment, in which FIG. 12(*a*) is a structural diagram showing the main portion of a contactless reader/writer mounted on a cellular phone radio that operates by means of a battery, FIG. 12(*b*) is a structural diagram showing the main portion of a contactless reader/writer mounted on a charging device, and FIG. 12(*c*) is an explanatory diagram showing the application state of the contactless reader/writer during charging.
Figure 12B:
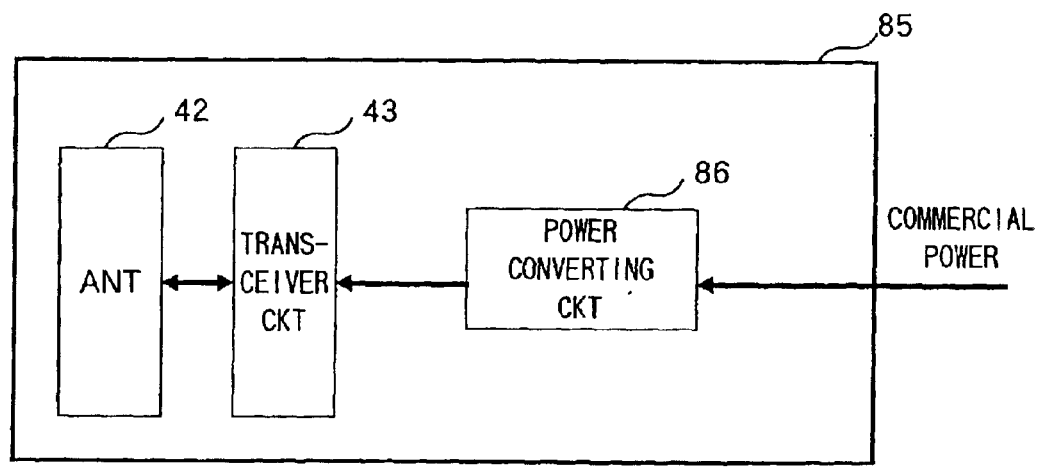
Figure 12C:
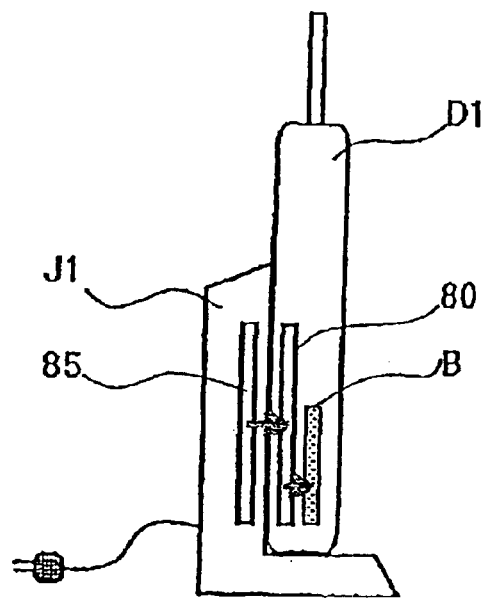

FIG. 12(*a*) is a structural diagram showing the main portion of a contactless reader/writer that is mounted on an electronic device actuated by a battery, for example, a cellular phone radio or a PDA. The contactless reader/writer 80 includes at least an antenna 42 embedded in a housing cap, a transceiver circuit 43 connected to the antenna 42, and a charging circuit connected to an output side of the transceiver circuit 43. The charging circuit 81 includes a constant voltage circuit 811 that supplies a constant voltage to the structural parts of a downstream reader/writer function from a power supply and stably outputs a power of a constant value to a charging terminal of a battery B.

FIG. 12(*b*) is a structural diagram showing the main portion of a contactless reader/writer 85 that is mounted on a charging device for charging an electronic device. The contactless reader/writer 80 includes an antenna 42 embedded in a housing cap, a transceiver circuit 43 connected to the antenna 42, a transceiver circuit 43 connected to the antenna 42 and a power converting circuit 86 for converting a commercial power into a charging power. The power converting circuit 86 corresponds to the power supply sections 47, 47*a* and 47*b* shown in FIGS. 4 to 8.

The antenna 42 and the transceiver circuit 43 function as an electromagnetic induction coil that induces an electric power by means of electromagnetic induction at the electronic device side when the charging device side and the electronic device side approach each other.

In use, as shown in FIG. 12(*c*), an electronic device D1 is set in the vicinity of a charging device J1, and a charging power is supplied to the electronic device D1 side from the charging device J1 side through the contactless reader/writer 85. The contactless reader/writer 80 at the electronic device D1 side inputs the power induced by the antenna 42 and the transceiver circuit 43 to the charging circuit 81. The charging circuit 81 stabilizes the induced power to a constant value higher than a rated voltage of the battery B by means of the constant voltage circuit 811 and supplies the stabilized power to the charging terminal 82 of the battery B. As a result, the battery B of the electronic device D1 is charged.

Figure 13A:
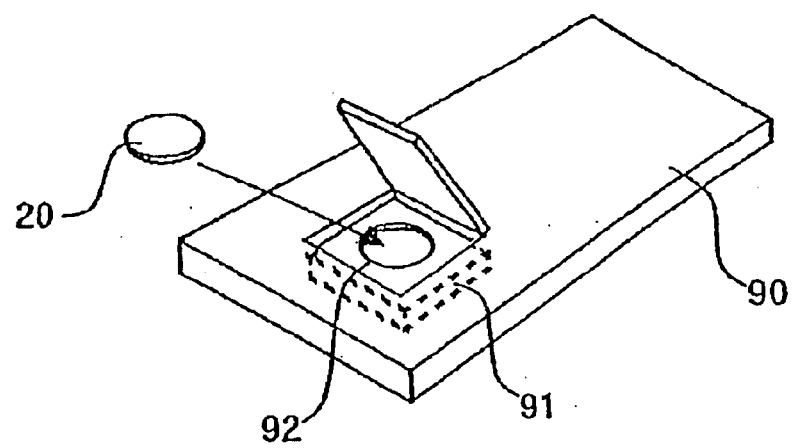
FIGS. 13(*a*) to 13(*c*) are structural diagrams showing a contactless reader/writer in accordance with an eighth embodiment, in which FIGS. 13(*a*) and 13(*b*) are diagrams showing the structure of a PC card on which the contactless reader/writer is mounted.
FIG. 13(c) is an explanatory diagram showing the application mode of the PC card.
Figure 13B:
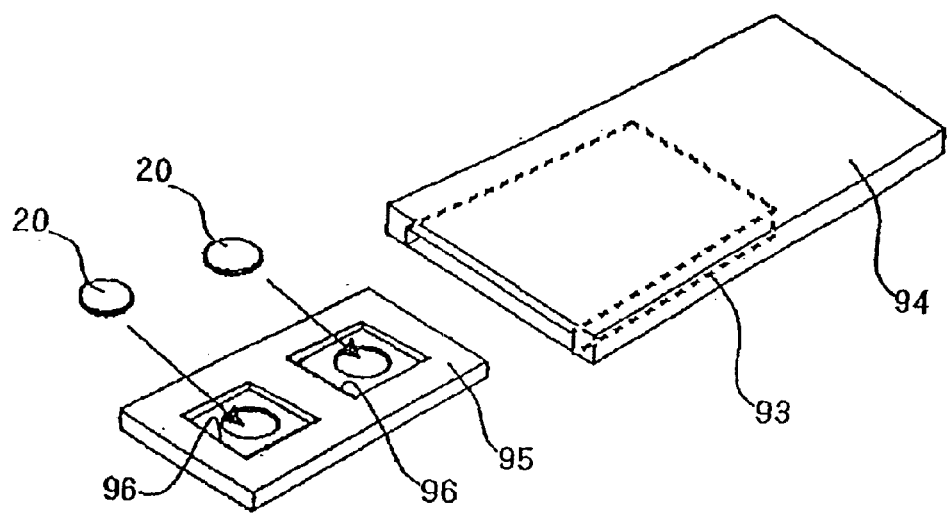
Figure 13C:
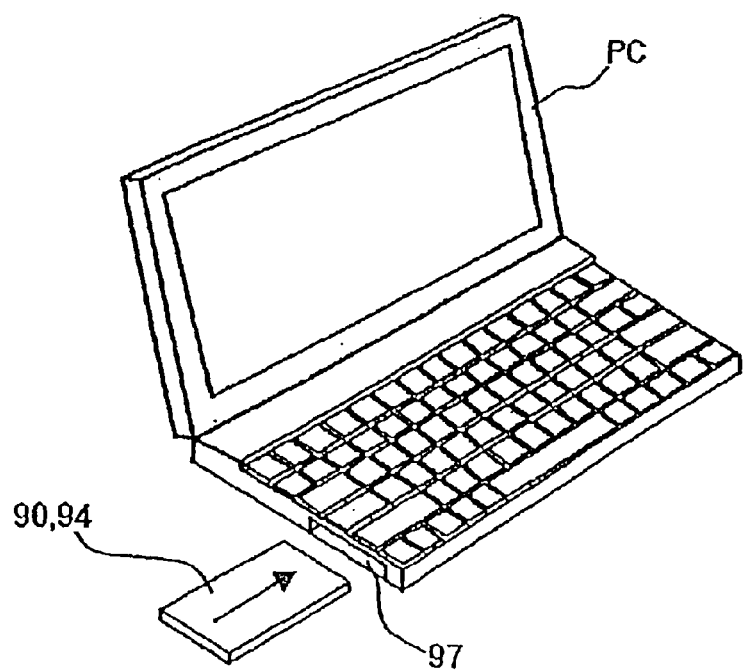
Figure 14:
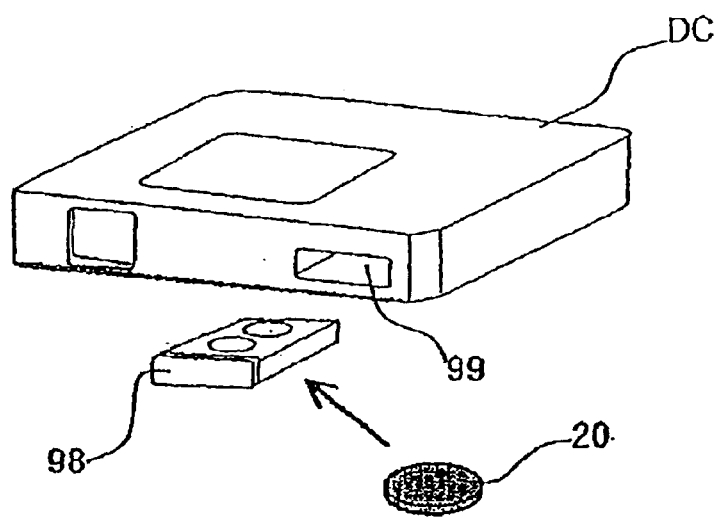
FIG. 14 is an explanatory diagram showing a use state of an image recording card for a digital camera on which a contactless reader/writer is mounted.

An exclusive charging device is normally provided in the electronic device D1, and the electronic device is set at a predetermined position of the charging device so that their contacts are brought in contact with each other, to thereby enable charging. Therefore, a charging device different in the model, the configuration and so on cannot be employed. However, in this embodiment, battery charging is enabled regardless of the model, the configuration and so on. (8) Eighth Embodiment The contactless reader/writer according to the present invention can be mounted on a card medium such as a PC card in use. For example, a PC card 90 the appearance of which is shown in FIG. 13(*a*) accommodates a contactless reader/writer 91 in the interior of a housing and is formed with a media holder 92 for detachably bearing a coin type media 20 on a surface portion thereof. As shown in FIG. 13(*b*), a structure may be made in such a manner that a contactless reader/writer 95 having a media holder 96 forbearing a plurality of coin type media 20 is installed in an inner space 93 of a PC card 94. Application program and data are recorded on the coin type media 20.

The PC cards 90 and 94 are equipped into a card slot 97 of a personal computer or the like in use as shown in FIG. 13(*c*), and its use mode depends on the sort of the born coin type media 20. For example, the coin type media 20 can be employed as a rim-bubble recording device of a personal computer PC, employed as a recording medium of a program code read and executed by the personal computer PC, or employed as a transmission medium of electronic data read from an external electronic device. In case of a PC card having a communication function, communication environmental data can be saved in the coin type media 20 in use.

Figure 15:
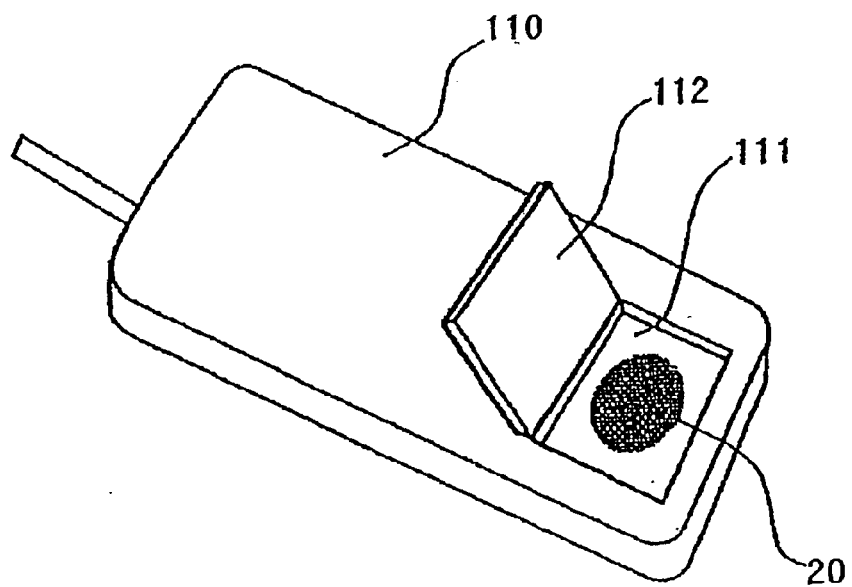
FIG. 15 is a perspective view showing the appearance of a cellular phone radio with which the contactless reader/writer shown in FIG. 4 or 5 is integrated.

Also, as shown in FIG. 15, the PC card can be employed as an image record card of a digital camera DC. That is, the coin type media 20 is inserted into a card-shaped media holder 98, and photograph data is allowed to be recorded on the coin type media 20. Thereafter, the image record card 98 is inserted into a card slot 99 of the digital camera DC for saving the image data, etc. The image record card 98 is offered to a photo-laboratory or the like whereby a record image can be outputted to a printing sheet or outputted to a high-resolution printer.

(9) Ninth Embodiment

The contactless IC reader/writer according to the present invention can be so structured as to execute information processing on the basis of read digital information in addition to read and write of the digital information (program code, data, etc.) with respect to the coin type media 20, 20*a* and 20*b*. Specifically, the contactless IC reader/writer includes a processor that reads and executes the digital information and a memory that records required program or the like thereon. The processor and the memory may be made into an IC chip and accommodated within the housing. The information processing result by the processor is outputted to a display or the like of an electronic device on which the contactless IC reader/writer is mounted and recorded on a digital information reading device.

Since the contactless IC reader/writer thus structured can conduct information processing only internally by the processor, a range of a design modification at the electronic device side on which the contactless IC reader/writer is mounted can be reduced.

Also, the same function as that given to the coin type media can be easily realized on the basis of the digital information recorded on the coin type media.

3. Portable Communication Device

Subsequently, a description will be given of an embodiment of a portable communication device on which the above contactless reader/writer is mounted. This embodiment shows an example of the cellular phone radio, but the present invention is not limited to this example. Also, the cellular phone radio includes a narrowly interpreted cellular phone as well as a PHS, a portable transceiver, an automobile phone and so on.

First, a description will be given of a cellular phone radio on which the above-mentioned contactless reader/writer 40, 50, 55, 56, 57 or 58 is mounted. Those contactless reader/writer may be built in the cellular phone radio as they are. However, this embodiment shows an example in which a cellular phone radio integrated with the contactless reader/writer.

FIG. 15 is a perspective view showing the appearance of a cellular phone radio 110 where the contactless reader/writer 40/50 shown in FIG. 4 or 5 is integrated within the housing. The lower portion of the back surface of the cellular phone ratio 110 is formed with a media holder 111 for bearing the coin type media 20 and a cap 112. The antenna 42 is embedded in the cap 112 of the housing and becomes in parallel with the coin type media 20 when the cap 112 is closed.

In the cellular phone radio 110 thus structured, the coin type media 20 can be used as, for example, an SIM (subscriber identity module). A subscriber identity ID is recorded on the SIM. As a result, in the case where a new cellular phone radio 110 is purchased or the cellular phone radio 110 is selectively used according to the intended use, the SIM may be replaced. Also, it is possible to receive the same service through various cellular phone radios by replacing the SIM. That is, the cellular phone radio can be employed as in a public phone.

Figure 16:
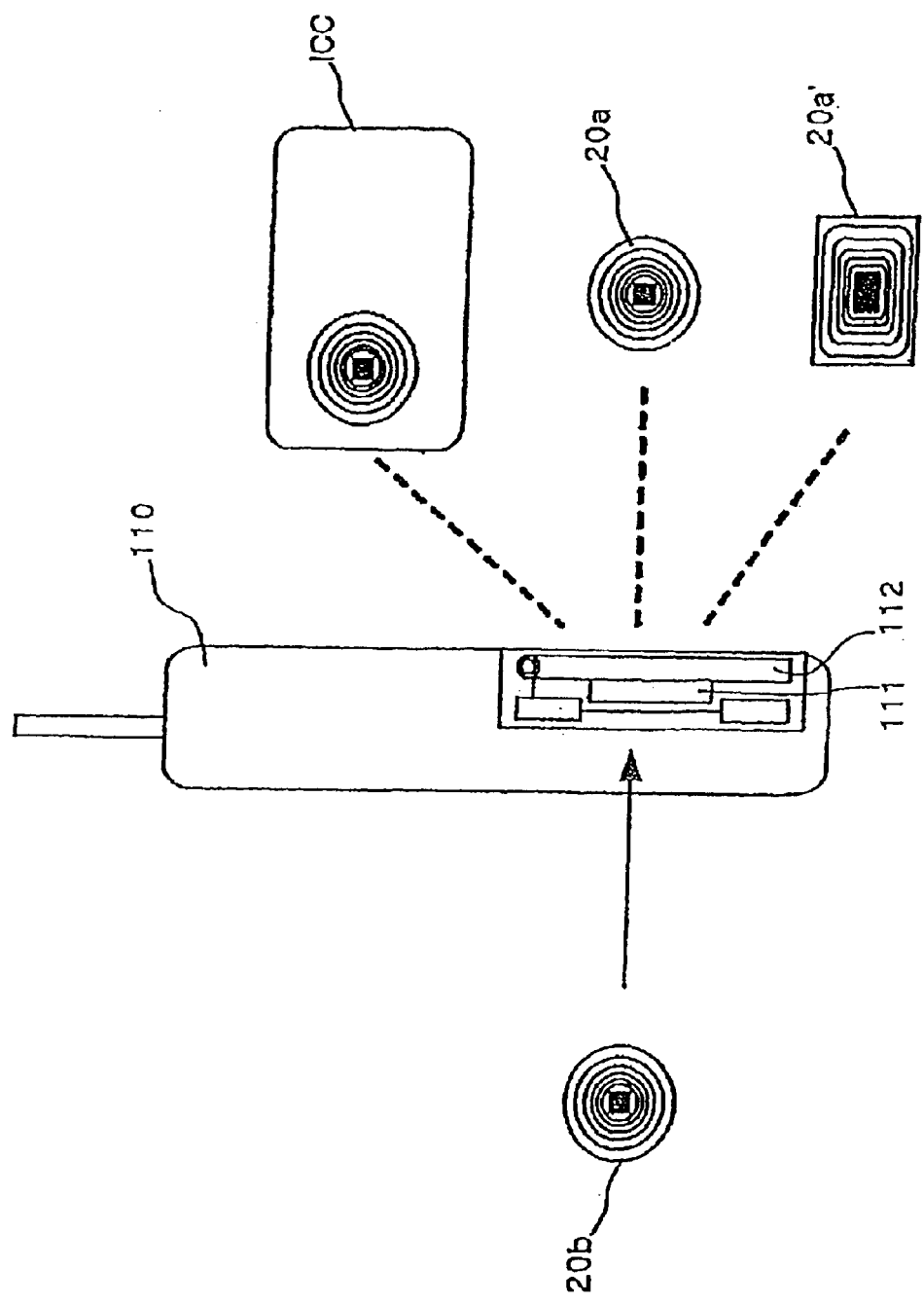
FIG. 16 is a conceptual explanatory diagram showing an example of an application mode of the cellular phone radio.

Also, as shown in FIG. 16, since the read and write of the digital information can be conducted with respect to the recording regions of both the coin type media 20b born by the media holder 111 and an external contactless IC card ICC, a coin type media 20a or a contactless IC media 20b' having another configuration, it is possible to access to the external contactless IC card ICC, the coin type media 20 or another system by using the security information recorded on the internal coin type media 20.

In the case where a processor or the like is provided in the contactless reader/writer as in the ninth embodiment, and the security information or the program code recorded on the internal coin type media is read to execute required information processing, the processing result can be recorded on the coin type media 20. For example, it is possible that the cellular phone radio 110 is spread before a POS terminal, an automatic vending machine, a portable settling terminal or the like to conduct electronic settlement processing, and its result is recorded on the coin type media.

As other applications that can be realized by the cellular phone radio 110, there is a prepaid card such as a gift card, novelty card, a ticket card or a telephone card. Also, if the cellular phone radio 110 is spread before the prepaid card, a prepaid value can be taken in the interior of the cellular phone radio 110 so as to conduct the electronic settlement.

The name and the address are written in the memory region of the coin type media 20 by the cellular phone radio 110 per se, and the coin type media 20 can be utilized as an electronic business card. Also, if data is read and written with respect to the electronic business card by spreading the cellular phone radio 110 before a counterpart electronic business card, the convenience can be enhanced. In addition, it is possible that the identification data or the key information of an automobile owner is recorded on one coin type media, and the cellular phone radio 110 is used as an electronic key, or an automobile travel state is recorded on another coin type media, and utilized for analysis of the travel history.

Figure 17:
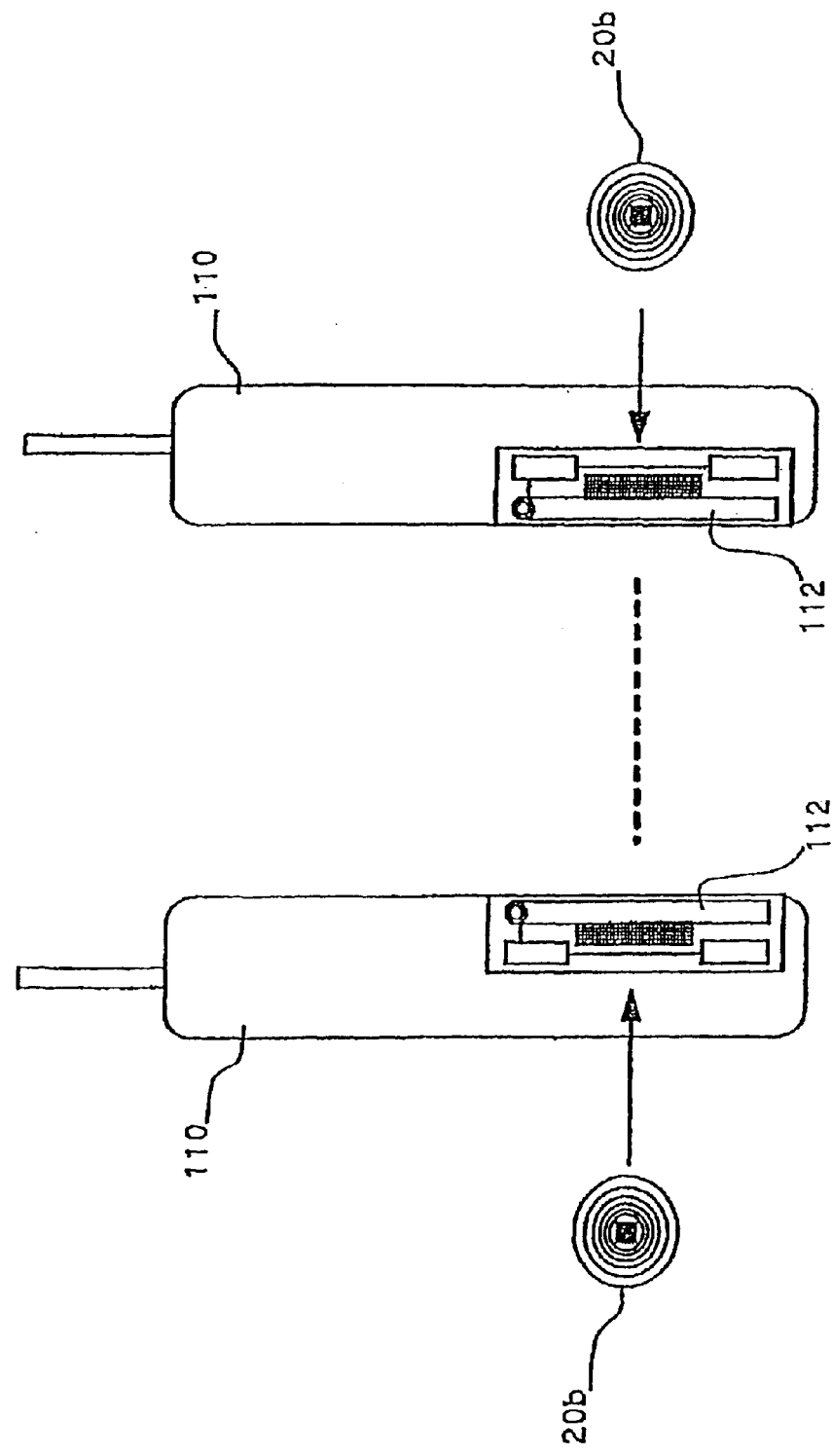
FIG. 17 is a conceptual explanatory diagram showing another application mode of the cellular phone radio.

Also, as shown in FIG. 17, the cellular phone radios 110 are permitted to approach each other so that the recorded information of the respective coin type media 20b can be exchanged.

Figure 18:
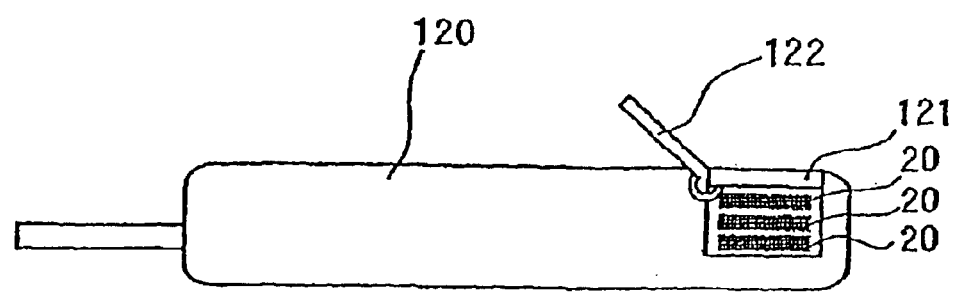
FIG. 18 is a cross-sectional view showing a cellular phone radio on which a contactless reader/writer is mounted where a plurality of coin-type media can be stacked one on another.

Not only one coin type media 20 but also a plurality of coin type media 20 can be born at the same time. FIG. 18 is a cross-sectional view showing the cellular phone radio 120 having a media holder 121 which is capable of stacking a plurality of coin type media 20 one on another.

Figure 19:
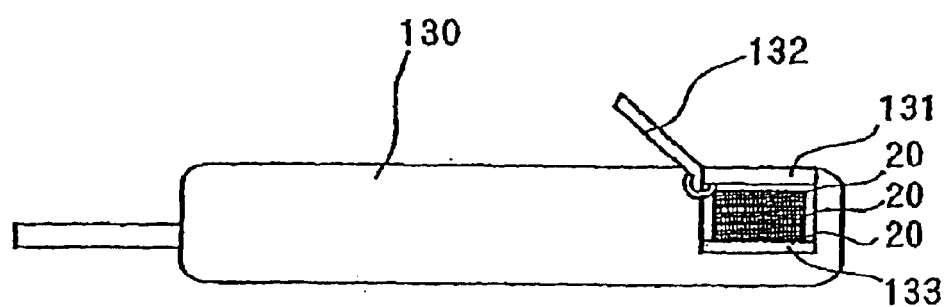
FIG. 19 is a cross-sectional view showing a cellular phone radio on which a contactless reader/writer is mounted where a plurality of coin-type media can be stacked one on another, and a plurality of antennas are provided.
Figure 20:
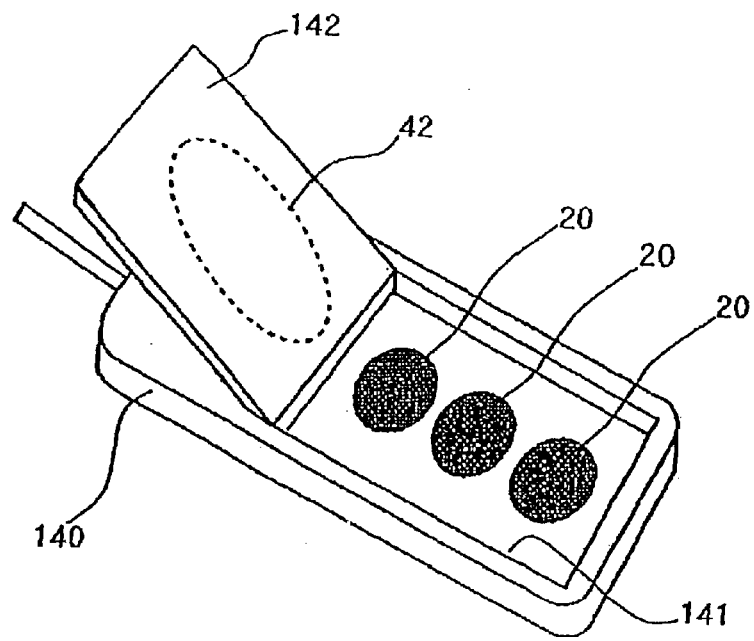
FIG. 20 is a perspective view showing the appearance of a cellular phone radio on which a contactless reader/writer is mounted where a plurality of coin-type media can be arranged in parallel and one antenna is provided.
Figure 21:
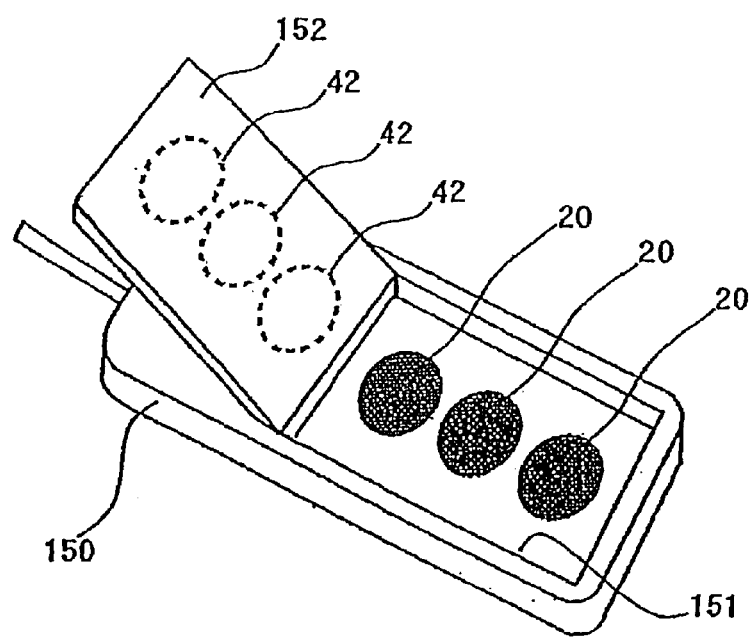
FIG. 21 is a perspective view showing the appearance of a cellular phone radio on which a contactless reader/writer is mounted where a plurality of coin-type media can be arranged in parallel and antennas of the same number as that of the coin-type media are provided.

An antenna 42 is embedded in a cap 122. A cellular phone radio 120 is integrated with the contactless reader/writer 55 shown in FIG. 6. FIG. 19 is a cross-sectional view showing a cellular phone radio 130 integrated with the contactless reader/writer 56 shown in FIG. 7. An antenna 42a is embedded in a housing cap 132, and an antenna 42b is embedded in a bottom portion 133 of a media holder 131. FIG. 20 is a cross-sectional view showing a cellular phone radio 140 integrated with the contactless reader/writer 57 shown in FIG. 8, and FIG. 21 is a cross-sectional view showing a cellular phone radio 150 integrated with a contactless reader/writer 58 shown in FIG. 9. The antenna 42 is embedded in caps 142 and 152 corresponding to media holders 141 and 151 and become in close contact with the coin type media 20 in parallel when the caps 142 and 152 are closed.

The contactless readers/writers 60 and 70 having the structures shown in FIGS. 10 and 11 can be integrated with the cellular phone radio.

It is normal that the cellular phone radios 110 to 150 are provided with a display and a sound producing mechanism. The chip having a processor and so on shown in the ninth embodiment is mounted on the cellular phone radio so that required information processing can be executed on the basis of the digital information read from a plurality of coin type media 20.

The processor has a sound source controller that reproduces a sound on the basis of sound source data and a display controller that allows an image to be displayed on a display on the basis of image data, by executing the program code recorded on a memory. The sound source data is recorded on one of the coin type media 20, and the image data outputted in association with the sound source data is recorded on the other coin type media 20. Then, the sound source data is read so that the sound producing mechanism is permitted to reproduce a sound by the sound source controller, and an image is displayed on the display on the basis of the image data read in synchronism with the sound source data. The cellular phone radios 110 to 150 thus structured are used while the coin type media 20 are appropriately interchanged, whereby letter data is displayed on the display, and a voice or BGM (background music) corresponding to the letter data can be listened by a receiver or an ear phone.

For example, the cellular phone radio can be employed as a portable KARAOKE machine. That is, it is possible that a song is sung while the text is displayed on a display and melody is listened by an earphone, and the sung contents are recorded.

It is possible to only display the letter data or to produce the sound on the basis of the sound source data.

The above description is given of the cellular phone radio. However, the present invention can be applied to a personal computer, a portable terminal (PDA), a portable audio device and so on, likewise.

4. Information Transmission System

Subsequently, a description will be given of an embodiment of an information transmission system to which the present invention is applied.

This embodiment shows an example in which information transmission is conducted by using the above-mentioned contactless IC media and portable communication device. As the portable communication device, there is used, for example, a cellular phone radio 110. The cellular phone radio 110 mounts a contactless reader/writer having the above-mentioned built-in processor, etc., thereon. In the case of using the contactless reader/writer, an appropriate function is assigned to one of the operation bottoms of the cellular phone radio 110.

(1) Periodical Publication Article Issuance System

Figure 22:
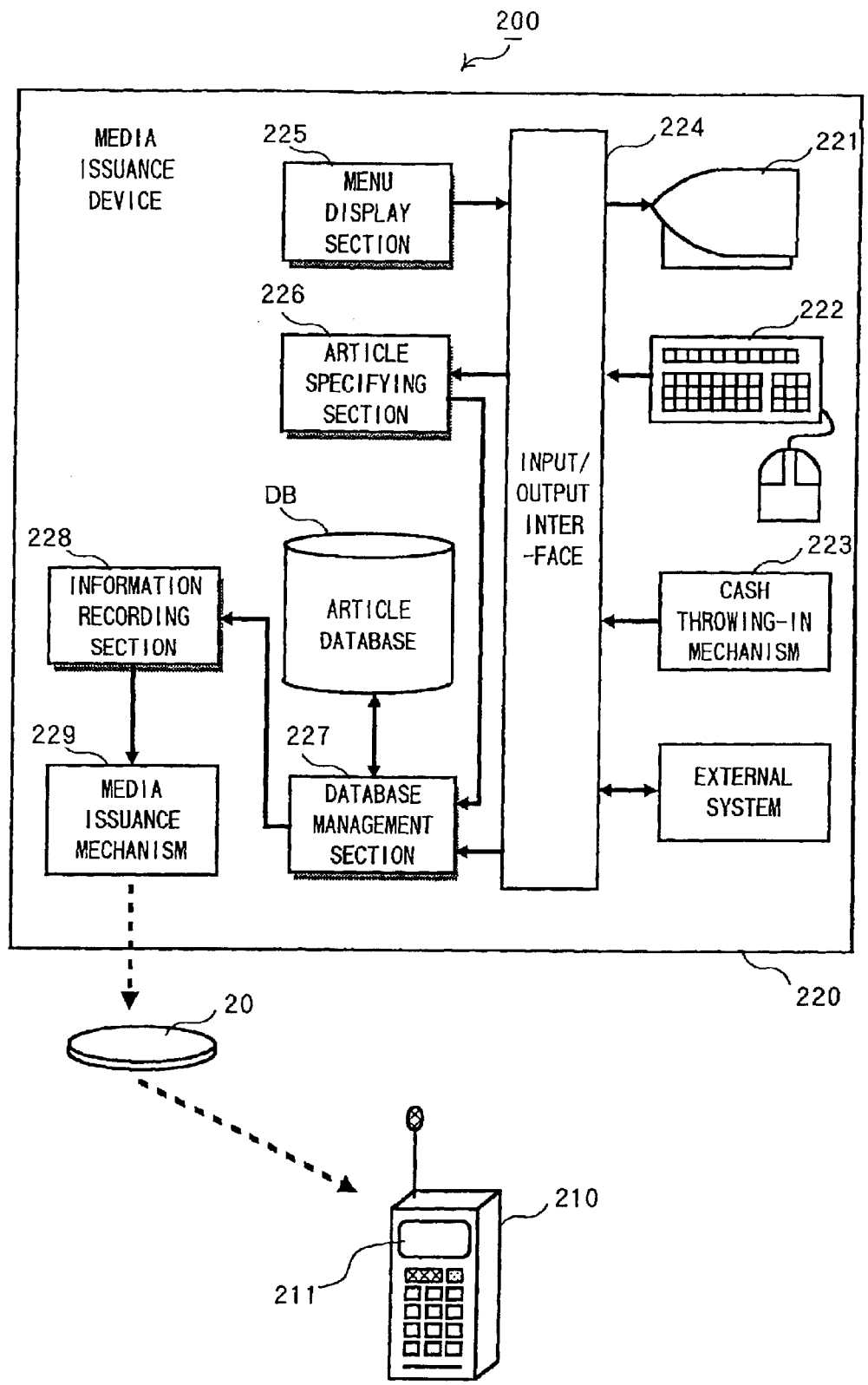
FIG. 22 is a structural diagram showing a system which converts an article of a newspaper, a weekly magazine or a monthly magazine into digital information while periodically updating the article and offers the article to a user.

The system converts an article of a newspaper, a weekly magazine or a monthly magazine into digital information while periodically updating the article and offers the user the article. FIG. 22 is a structural diagram of the system. In the present specification, the digital information is directed to letter data, image data, digital contents and so on, and includes sound source data as occasion demands. As the contactless IC media for recording the digital information, the above-mentioned coin type media 20 is employed for convenience, however, it is needless to say that a sheet-shaped media may be used.

The periodical publication article issuance system 200 is made up of a cellular phone radio 210 that interchangeable bears the coin type media 20 and a media issuance device 220.

The media issuance device 220 includes a display 221, a data input device 222, a cash throwing-in mechanism 223, an input/output interface 224, an article database DB, and a media issuance mechanism 229. In addition, the media issuance device 220 includes the functional blocks consisting of a menu display section 225 formed by reading and executing a given program code by the internal processor, an article specifying section 226, a database management section 227 and an information recording section 228.

The menu display section 225 allows a menu screen for guiding the periodical article dealt with by the subject device to be displayed on a display 221 through the input/output interface 224. The data input device 222 inputs the select information on the periodical article. When the article specifying section 226 receives the select information on the specific article from the data input device 222 and cash throwing-in information (value information) from the cash throwing-in mechanism 223, the article specifying section 226 notifies the database management section 227 of information for specifying the periodical article. The database management section 227 reads the digital information from the article database DB on the basis of the information, and delivers the digital information to the information recording section 228. The information recording section 228 records the digital information on the coin type media 20 and issues it.

The guide information on the periodical article of the kind and contents according to an amount of money is displayed on a menu screen so that the user can arbitrarily select the guide information through the data input device 222. The contents of the article database DB is periodically updated by the database management section 227 on the basis of data transmitted from, for example, an external system. The publication article to be updated is updated every data if it is a newspaper, every week if it is a weekly magazine and every month if it is a monthly publication.

The user purchases the coin type media 20 on which the digital information is recorded from the media issuance device 220 and inserts the coin type media 20 into a media holder of the cellular phone radio 210 and permits the recorded information to be displayed on a display 211 by depression of an operating button. In the case where sound source data is also recorded on the coin type media 20, its contents are listened by a receiver or an earphone.

The information transmission system according to the present invention can be applied to a system that periodically or non-periodically issues the digital contents other than the periodical publication article information.

(2) Information Guide System

An address, a postcode, a map code, an area announcement, an announcement of establishment, a train schedule, a business describing pamphlet or the like is made into digital information and then recorded on the contactless IC media. Then, the contactless IC media is embedded in a water-repellent plate and located or stuck on an appropriate place. The information is read from the plate by using a portable communication device on which the contactless reader/writer of the present invention is mounted, for example, the cellular phone radio and then displayed on a display. The place where the plate is located is, for example, a building or a telegraph in case of "the address, etc.", an address indicating board in case of "the map or the map code", the outer wall of the building in case of "the area announcement", the institution doorway in case of "the announcement of establishments", a wall surface of a station platform in case of "train schedule", and the doorway of a store or a business establishment in case of "trade prospectus".

The user depresses an appropriate operation button and spreads the cellular phone ration before those plates. As a result, the reader/writer function of the cellular phone radio is effected, and the digital information is read and visualized and displayed on a display.

A plurality contactless IC media can be embedded in the same guide panel on which the guide information is drawn or stuck on the guide panel. Also, a gate having a built-in contactless reader/writer is located on the gate of a concert or sports site so that side guide information can be delivered by spreading the cellular phone radio before the gate by the user.

INDUSTRIAL APPLICABILITY

As was described above, according to the present invention, the contactless IC media excellent in general purpose is obtained. Also, there can be provided an applied system which can add more values by using the contactless IC media.

What is claimed is:

1. A contactless reader/writer, characterized by comprising:
   a movable media bearing member for bearing a plurality of contactless IC media each having a digital information recording region on the same plane at the same time;
   a radio transceiver circuit having an antenna disposed at a specific position which is in parallel with said media bearing member; and
   a displacement mechanism that displaces said media bearing member on said plane so that a specific one of said plurality of contactless IC media approaches said specific position;
   wherein the digital information is received and transmitted between said specific contactless IC media and said antenna.

2. The contactless reader/writer as claimed in claim 1, characterized in that said media bearing member includes a holder for bearing said plurality of contactless IC media at given intervals at the same time; and
   in that said displacement mechanism brings said specific contactless IC media in close contact with said antenna.

3. The contactless reader/writer as claimed in claim 1, characterized in that the same function as a function given to said contactless IC media is realized on the basis of the digital information recorded on said born contactless IC media.

4. The contactless reader/writer as claimed in claim 3, characterized by further comprising information processing means for executing information processing on the basis of the digital information read through said control circuit;
   wherein the information processing result by said information processing means is recorded on said specific contactless IC media from which the digital information has been read.

5. The contactless reader/writer as claimed in claim 3, characterized in that said contactless IC media is accommodated in a card medium used in an information processing device on which the card reader/writer is mounted.

6. The contactless reader/writer as claimed in claim 1, characterized in that the contactless reader/writer is built in a housing having an interface with an external electronic device;
and in that the digital information read out from said specific contactless IC media through said antenna is transmitted to said external electronic device through said interface.

7. A contactless reader/writer, characterized by comprising:
a media bearing member for bearing a plurality of contactless IC media each having a digital information recording regiion at the same time;
a read/write mechanism bearing member on which a media read/write mechanism including an antenna and a radio transceiver circuit is mounted; and
a displacement mechanism that displaces said read/write mechanism bearing member so that a specific one of said plurality of contactless IC media approaches said antenna;
wherein the digital information is received and transmitted wit respect to said specific contactless IC media through said antenna.

8. The contactless reader/writer as claimed in claim 7, characterized in that said media bearing member includes a holder for bearing said plurality of contactless IC media at given intervals at the same time; and
in that said displacement mechanism brings said specific contactless IC media in close contact with said antenna.

9. The contactless reader/writer as claimed in claim 7, characterized in that the same function as a function given to said contactless IC media is realized on the basis of the digital information recorde on said born contactless IC media.

10. The contactless reader/writer as claimed in claim 9, characterized by further comprising information processing means for executing information processing on the basis of the digital information read through said control circuit;
wherein the information processing result by said information processing means is recorded on said specific contactless IC media from which the digital information has been read.

11. The contactless reader/writer as claimed in claim 9, characterized in that said contactless IC media is accomodated in a card medium used in an information processing device on which the card reader/writer is mounted.

12. The contactless reader/writer as claimed in claim 7, characterized in that the contactless reader/writer is built in a housing having an interface with an external electronic device,
and in that the digital information read out from said specific contactless IC media through said antenna is transmitted to said external electronic device through said interface.

13. A contactless reader/writer for writing of information in a contactless manner with respect to a media embedding a contactless IC module having a digital information recording region, or for reading of the information in a contactless manner with respect to the contactless IC media, wherein said contactless reader/writer is built in a housing of an electronic device, characterized in that the contactless reader/writer comprising:
a radio transceiver circuit having at least one antenna, said antenna having a coverage at predetermined portion within the housing and acoverage to the outside direction of said housing;
a media bearing member for bearing at least one said media at predetermined portion;
a control section for controlling the read and write of digital information with respect to said media at the predetermined portion and another media at external of said housing through said radio transceiver circuit, and for controlling transfer of digital information between an external electronic circuit and said media at predetermined portion of said another media.

14. The contactless reader/writer as claimed in claim 13, characterized in that:
said radio transceiver circuit comprising a first transceiver circuit for wireless transmitting and receiving between said media at predetermined portion and a second transceiver circuit for wireless transmitting and receiving between said another media;
said control section conducts the read control or the write control of digital information with respect to each media through said first transceiver circuit or said second transceiver circuit.

15. A contactless reader/writer for writing of information with respect to a media embedding a contactless IC module having a recording region, or for reading of information with respect to said media, wherein said contactless reader/writer is built in a predetermined housing, characterized in that the contactless reader/writer comprising:
a media bearing member for bearing said media;
a radio transceiver circuit having an antenna; said antenna having a coverage at a bearing portion of said media bearing member and a coverage to external direction of said housing;
a control section for enabling access to another media disposed at external of said housing based on the information recorded in the media born by said media bearing member through the radio transceiver circuit, or for allowing the information be taken from said another media to the media born by said media bearing member.

16. A contactless reader/writer for writing of information in a contactless manner with respect to a media embedding a contactless IC module having a digital information recording region, or for reading of the information in a contactless manner with respect to the contactless IC media, wherein said contactless reader/writer is built in a housing of an electronic device, characterized in that the contactless reader/writer comprising:
a media bearing member for bearing a plurality of said media;
a radio transceiver circuit having a plurality of antennas, wherein each of said antennas having a coverage at a bearing portion of said media bearing member and a coverage to external direction of said housing and operating under predetermined condition;
a control section for enabling access to another media disposed at external of said housing based on the information recorded in the media which wirelessly communicate through any antenna of said radio transceiver circuit and which is of a plurality of media born by said media bearing member, or for allowing the information be taken from said another media in the media born by said media bearing member through any antenna of said radio transceiver circuit.

17. The contactless reader/writer as claimed in claim 16, characterized in that:

said antennas are provided with the same number as the number of the media born in the media bearing member, and one antenna corresponds to one media.

18. The contactless reader/writer as claimed in claim 17, characterized in that:

a plurality of said antennas are disposed on the same plane, and each media is disposed in close contact with corresponding antenna.

19. A contactless reader/writer comprising:

a media bearing member for bearing a contactless IC media having a recording region;

a radio transceiver circuit having an antenna; and a control circuit for controlling the read or write of digital information with respect to both of the recording regions of a contactless IC media which is born by said media bearing member and an external contactless IC media having a recording region within a coverage of said antenna through said radio transceiver circuit, wherein said antenna is embedded in a housing part positioned between said born contactless IC media and said external contactless IC media.

* * * * *

UNITED STATES PATENT AND TRADEMARK OFFICE
CERTIFICATE OF CORRECTION

PATENT NO. : 7,051,933 B1 Page 1 of 1
APPLICATION NO. : 09/763523
DATED : May 30, 2006
INVENTOR(S) : Jiro Nagaoka et al.

It is certified that error appears in the above-identified patent and that said Letters Patent is hereby corrected as shown below:

Col. 21 Line 13 "Regiion" should be corrected to --region--.

Col. 21 Line 22 "wit" should be corrected to --with--.

Col. 21 Line 33 "recorde" should be corrected to --recorded--.

Col. 21 Line 66 "acoverage" should be corrected to --a coverage--.

Col. 22 Line 9 "of" should be corrected to --or--.

Col. 22 Line 43 "in a contactless manner" should be deleted.

Col. 22 Line 44 "digital information" should be deleted.

Col. 22 Line 45 "the" should be deleted.

Col. 22 Line 45-46 "in a contactless manner" should be deleted.

Col. 22 Line 46 "the contacless IC" should be deleted and --said-- be inserted.

Col. 22 Line 47 after "a" the word --predetermined-- should be inserted.

Col. 22 Line 47-48 "of an electronic device" should be deleted.

Signed and Sealed this

Twentieth Day of March, 2007

JON W. DUDAS
*Director of the United States Patent and Trademark Office*